(12) United States Patent
Lu et al.

(10) Patent No.: US 11,579,405 B2
(45) Date of Patent: Feb. 14, 2023

(54) OPTICAL IMAGING LENS GROUP

(71) Applicant: Zhejiang Sunny Optical Co., Ltd, Ningbo (CN)

(72) Inventors: Fenglong Lu, Ningbo (CN); Fujian Dai, Ningbo (CN); Liefeng Zhao, Ningbo (CN)

(73) Assignee: Zhejiang Sunny Optical Co., Ltd.

( * ) Notice: Subject to any disclaimer, the term of this patent is extended or adjusted under 35 U.S.C. 154(b) by 363 days.

(21) Appl. No.: 17/010,398

(22) Filed: Sep. 2, 2020

(65) Prior Publication Data

US 2021/0096326 A1 Apr. 1, 2021

(30) Foreign Application Priority Data

Sep. 27, 2019 (CN) .......................... 201910926575.9

(51) Int. Cl.
| | | |
|---|---|---|
| *G02B 13/18* | (2006.01) | |
| *G02B 9/64* | (2006.01) | |
| *G02B 3/04* | (2006.01) | |
| *H04N 5/341* | (2011.01) | |
| *G02B 5/00* | (2006.01) | |
| *G02B 13/00* | (2006.01) | |
| *G02B 27/00* | (2006.01) | |

(52) U.S. Cl.
CPC .................. *G02B 9/64* (2013.01); *G02B 3/04* (2013.01); *G02B 13/18* (2013.01); *G02B 5/005* (2013.01); *G02B 13/0045* (2013.01); *G02B 27/0025* (2013.01); *H04N 5/341* (2013.01)

(58) Field of Classification Search
CPC ...... G02B 13/18; G02B 9/64; G02B 27/0025; G02B 5/005; G02B 13/0045; G02B 3/04; H04N 5/341

USPC .................................. 359/708, 739, 740, 755
See application file for complete search history.

(56) References Cited

U.S. PATENT DOCUMENTS 8,599,495 B1* 12/2013 Tsai .......................... G02B 9/64
 359/755
8,767,315 B2* 7/2014 Tsai ......................... G02B 3/04
 359/755

(Continued)

FOREIGN PATENT DOCUMENTS

CN 208521051 U 2/2019
CN 109870788 A 6/2019
(Continued)

*Primary Examiner* — Evelyn A Lester
(74) *Attorney, Agent, or Firm* — Barnes & Thornburg LLP

(57) ABSTRACT

The present disclosure discloses an optical imaging lens group including, sequentially from an object side to an image side along an optical axis, a first lens, a second lens, a third lens, a fourth lens, a fifth lens, a sixth lens and a seventh lens having reactive power. The first lens has positive refractive power, a convex object-side surface, and a concave image-side surface. A total effective focal length f of the optical imaging lens group and half of a maximal field-of-view Semi-FOV of the optical imaging lens group satisfy: f*tan(Semi-FOV)>7.5 mm. A distance TTL along the optical axis from the object-side surface of the first lens to an imaging plane of the optical imaging lens group and half of a diagonal length ImgH of an effective pixel area on the imaging plane of the optical imaging lens group satisfy: TTL/ImgH<1.3.

20 Claims, 11 Drawing Sheets

(56) References Cited

U.S. PATENT DOCUMENTS

| | | | | |
|---|---|---|---|---|
| 8,902,511 | B2* | 12/2014 | Tsai | G02B 13/18 359/755 |
| 9,766,433 | B2* | 9/2017 | Chen | G02B 9/64 |
| 10,459,204 | B2* | 10/2019 | Liu | G02B 3/04 |
| 10,466,445 | B2* | 11/2019 | Lian | G02B 3/04 |
| 10,571,661 | B2* | 2/2020 | Huang | G02B 9/64 |
| 10,606,034 | B2* | 3/2020 | Fan | G02B 9/64 |
| 10,838,173 | B2* | 11/2020 | Hsueh | G02B 9/64 |
| 10,901,187 | B2* | 1/2021 | Jhang | G02B 13/0045 |
| 10,942,335 | B2* | 3/2021 | Hsueh | G02B 9/64 |
| 11,009,684 | B2* | 5/2021 | Jhang | G02B 9/64 |
| 11,016,270 | B2* | 5/2021 | Tang | G02B 9/64 |
| 11,036,033 | B2* | 6/2021 | Huang | G02B 27/0025 |
| 11,073,682 | B2* | 7/2021 | Fan | G02B 13/0045 |
| 11,090,360 | B2* | 8/2021 | Janson | A61K 8/64 |
| 11,262,552 | B2* | 3/2022 | Yang | G02B 27/0025 |
| 11,366,294 | B2* | 6/2022 | Hsu | G02B 13/004 |
| 11,391,927 | B2* | 7/2022 | Chen | G02B 13/0045 |
| 11,460,675 | B2* | 10/2022 | Hirano | G02B 13/18 |
| 11,460,677 | B2* | 10/2022 | Zhang | G02B 13/18 |
| 2014/0009843 | A1* | 1/2014 | Tsai | G02B 27/0025 359/708 |
| 2014/0253782 | A1* | 9/2014 | Tsai | G02B 9/64 359/708 |
| 2015/0042863 | A1* | 2/2015 | Tsai | G02B 13/18 359/708 |
| 2015/0070783 | A1* | 3/2015 | Hashimoto | G06T 5/002 359/708 |
| 2015/0198787 | A1* | 7/2015 | Kubota | G02B 9/64 359/755 |
| 2015/0247990 | A1* | 9/2015 | Kubota | G02B 9/64 359/755 |
| 2015/0247992 | A1* | 9/2015 | Ishizaka | G02B 9/64 359/708 |
| 2015/0268448 | A1* | 9/2015 | Kubota | G02B 9/64 359/755 |
| 2016/0025953 | A1* | 1/2016 | Jung | G02B 13/0045 359/755 |
| 2016/0033742 | A1* | 2/2016 | Huang | G02B 13/0015 359/708 |
| 2016/0033743 | A1* | 2/2016 | Chen | G02B 9/64 359/708 |
| 2016/0062086 | A1* | 3/2016 | Tsai | G02B 13/0045 359/708 |
| 2016/0124191 | A1* | 5/2016 | Hashimoto | G02B 9/64 359/708 |
| 2017/0235110 | A1* | 8/2017 | Chen | G02B 9/64 359/708 |
| 2018/0074299 | A1* | 3/2018 | Huang | G02B 13/0045 |
| 2019/0101729 | A1* | 4/2019 | Hsieh | G02B 13/0045 |
| 2019/0146184 | A1* | 5/2019 | Xu | H04N 5/2254 359/755 |
| 2019/0146185 | A1* | 5/2019 | Chen | G02B 13/0045 359/755 |
| 2019/0204553 | A1* | 7/2019 | Lian | G02B 13/0045 |
| 2019/0204554 | A1* | 7/2019 | Liu | G02B 9/64 |
| 2019/0204558 | A1* | 7/2019 | Jhang | G02B 13/0045 |
| 2019/0204559 | A1* | 7/2019 | Jhang | G02B 13/06 |
| 2019/0346664 | A1* | 11/2019 | Jhang | G02B 9/64 |
| 2019/0361203 | A1* | 11/2019 | Jhang | G02B 13/0045 |
| 2020/0073085 | A1* | 3/2020 | Huang | G02B 9/64 |
| 2020/0110247 | A1* | 4/2020 | Jhang | G02B 13/18 |
| 2020/0241258 | A1* | 7/2020 | Tang | G02B 13/0045 |
| 2020/0249438 | A1* | 8/2020 | Fan | G02B 9/64 |
| 2020/0363611 | A1* | 11/2020 | Huang | G02B 27/0025 |
| 2020/0371314 | A1* | 11/2020 | Geng | G02B 13/0045 |
| 2020/0393652 | A1* | 12/2020 | Kuo | G02B 9/64 |
| 2020/0393653 | A1* | 12/2020 | Chen | G02B 13/0045 |
| 2021/0003829 | A1* | 1/2021 | Dai | G02B 9/64 |
| 2021/0048638 | A1* | 2/2021 | Chen | G02B 9/64 |
| 2021/0048645 | A1* | 2/2021 | Li | G02B 13/0045 |
| 2021/0063699 | A1* | 3/2021 | Lyu | G02B 13/0045 |
| 2021/0239941 | A1* | 8/2021 | Tang | G02B 9/64 |
| 2021/0286154 | A1* | 9/2021 | Lian | G02B 9/64 |
| 2021/0294078 | A1* | 9/2021 | Jhang | G02B 13/0045 |
| 2021/0311289 | A1* | 10/2021 | Nitta | G02B 13/0045 |
| 2021/0349290 | A1* | 11/2021 | Gong | G02B 13/18 |
| 2022/0003971 | A1* | 1/2022 | Jhang | G02B 9/64 |
| 2022/0035138 | A1* | 2/2022 | Fan | G02B 9/64 |
| 2022/0137367 | A1* | 5/2022 | Zhou | G02B 13/06 359/708 |
| 2022/0137369 | A1* | 5/2022 | Hsu | G02B 13/0045 359/708 |
| 2022/0150390 | A1* | 5/2022 | Yang | G02B 27/0025 |
| 2022/0179173 | A1* | 6/2022 | Hu | G02B 13/0045 |
| 2022/0179175 | A1* | 6/2022 | Lin | G02B 9/62 |
| 2022/0179176 | A1* | 6/2022 | Lai | G02B 9/64 |
| 2022/0196980 | A1* | 6/2022 | Lai | G02B 27/0025 |
| 2022/0260811 | A1* | 8/2022 | Chen | G02B 13/0045 |
| 2022/0276470 | A1* | 9/2022 | Tsai | G02B 13/18 |
| 2022/0299740 | A1* | 9/2022 | Chen | G02B 9/64 |

FOREIGN PATENT DOCUMENTS

| | | |
|---|---|---|
| CN | 209215714 U | 8/2019 |
| TW | 1570476 B | 2/2017 |

* cited by examiner

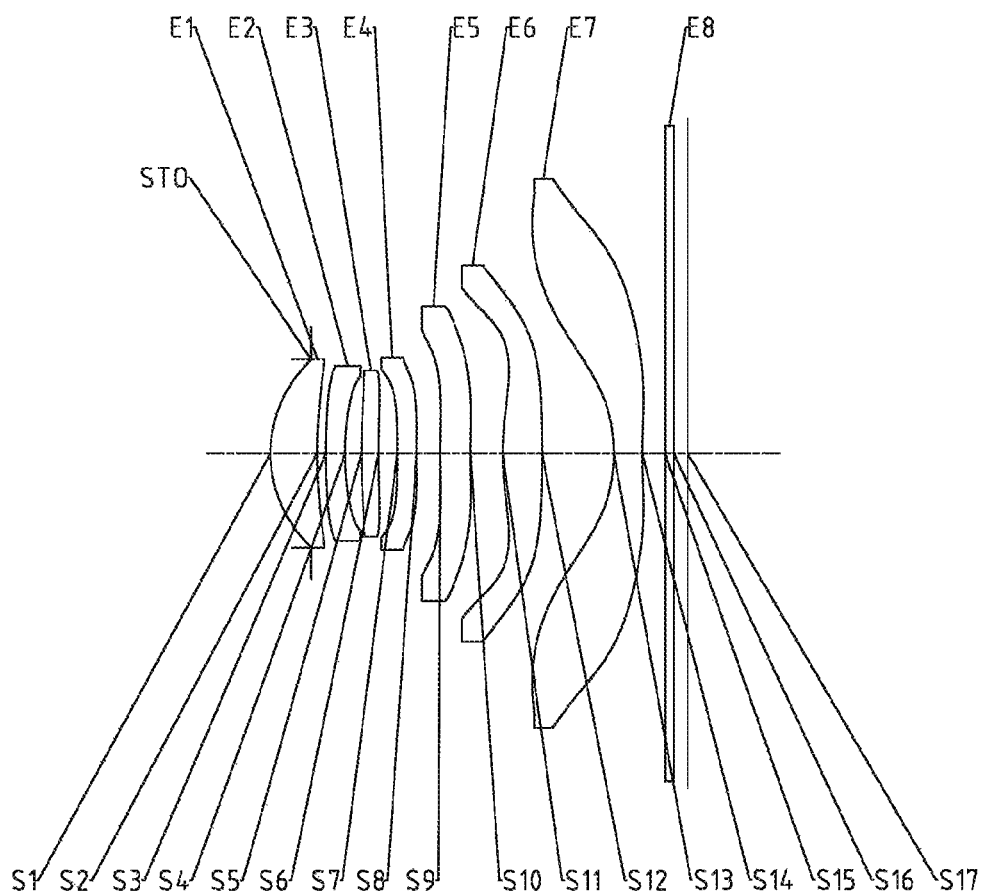
Fig. 1
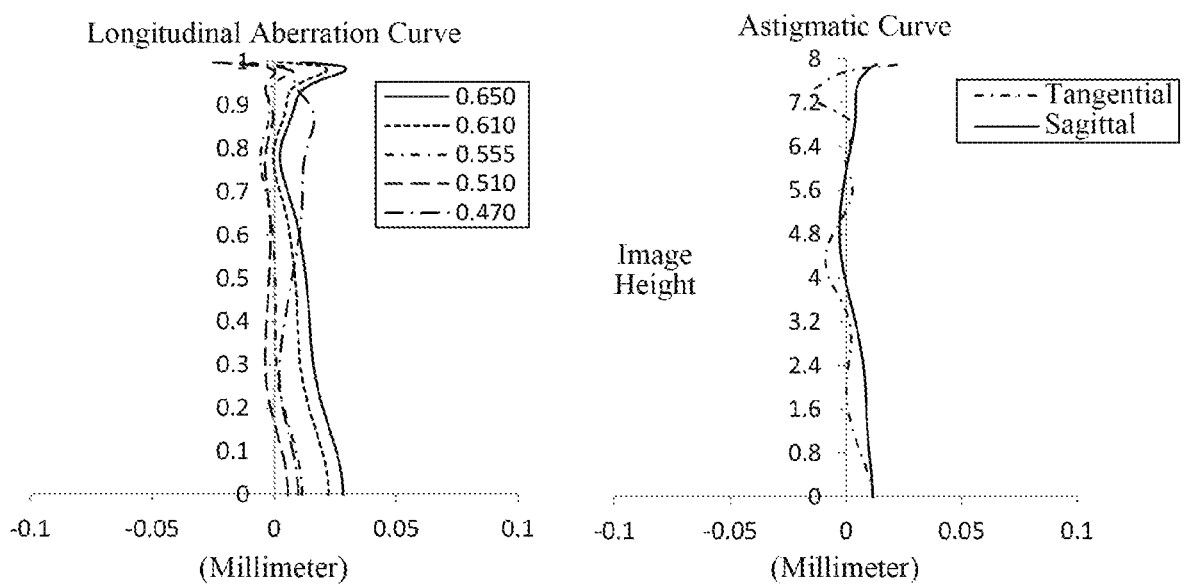
Fig. 2A
Fig. 2B

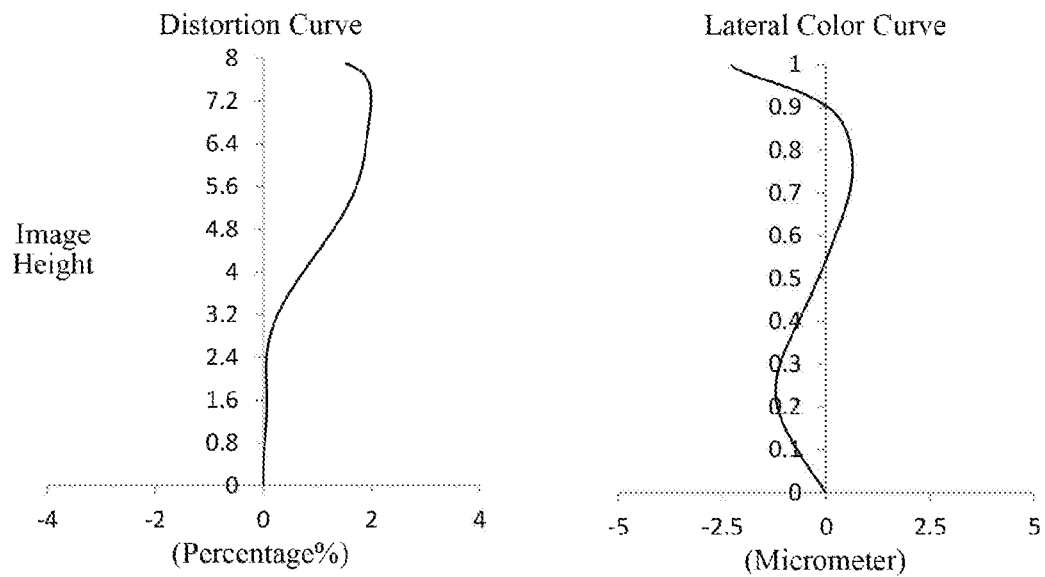
Fig. 2C
Fig. 2D
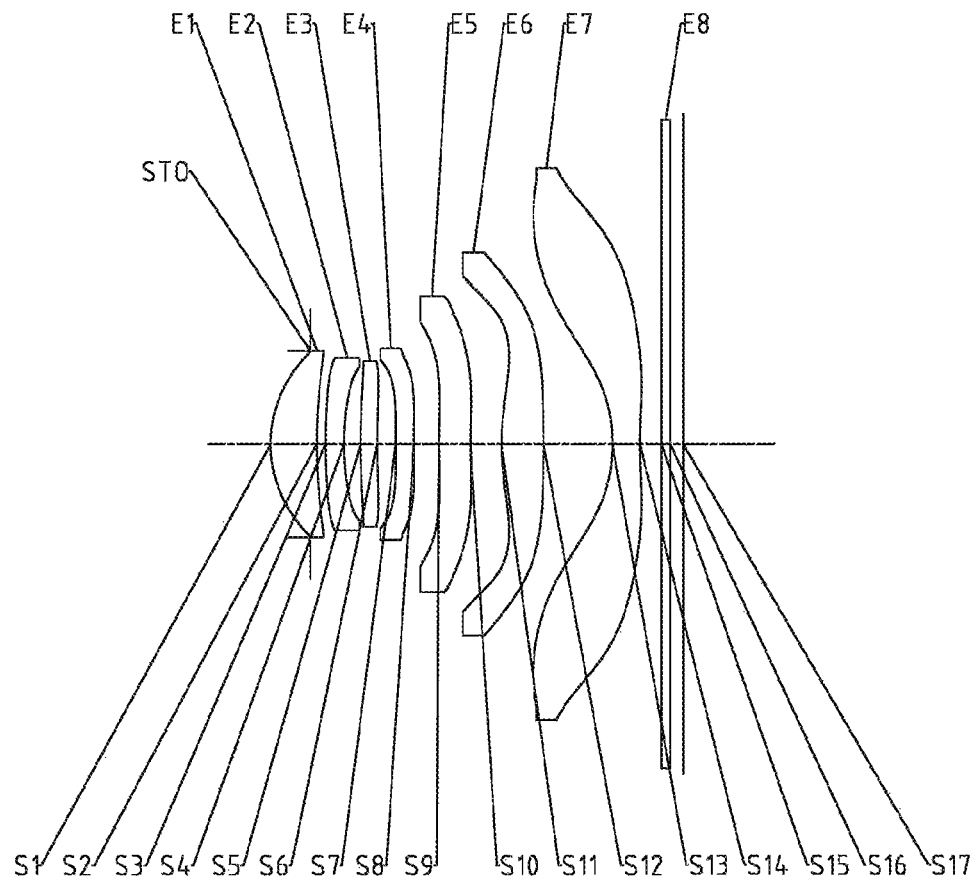
Fig. 3

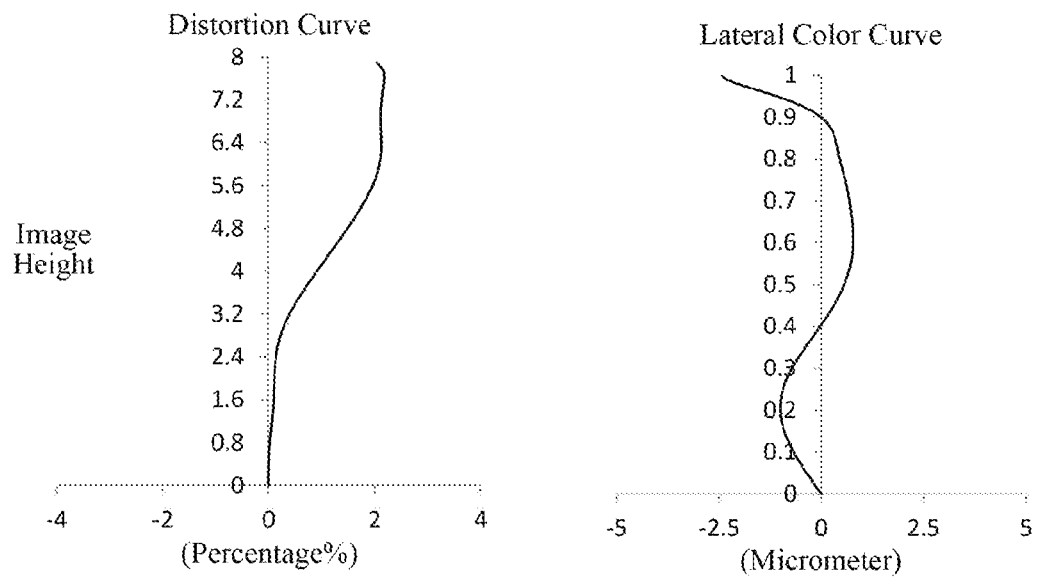
Fig. 6C
Fig. 6D
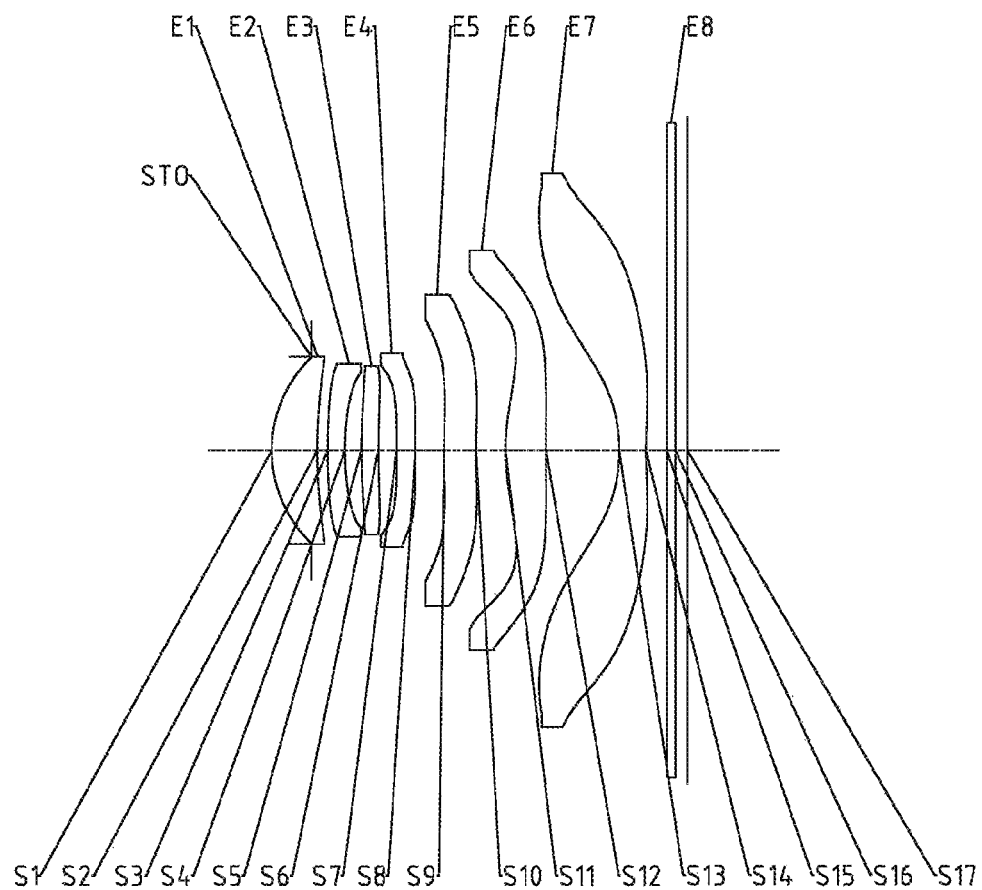
Fig. 7

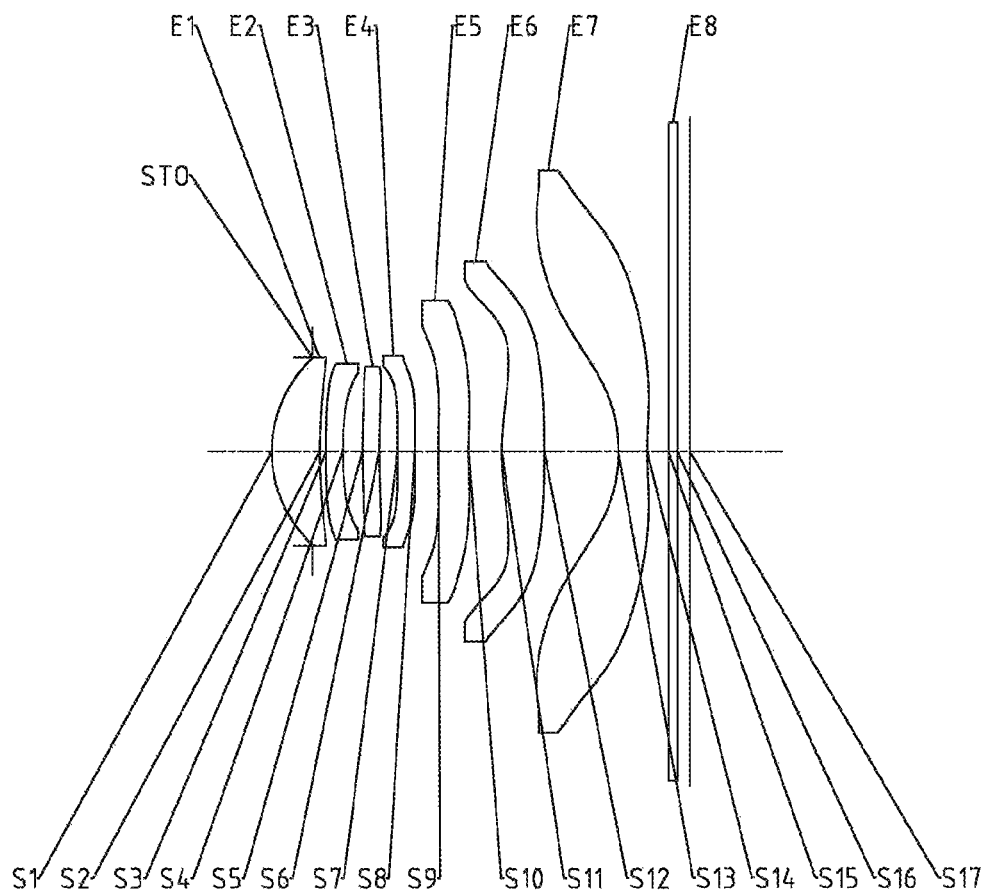
Fig. 9
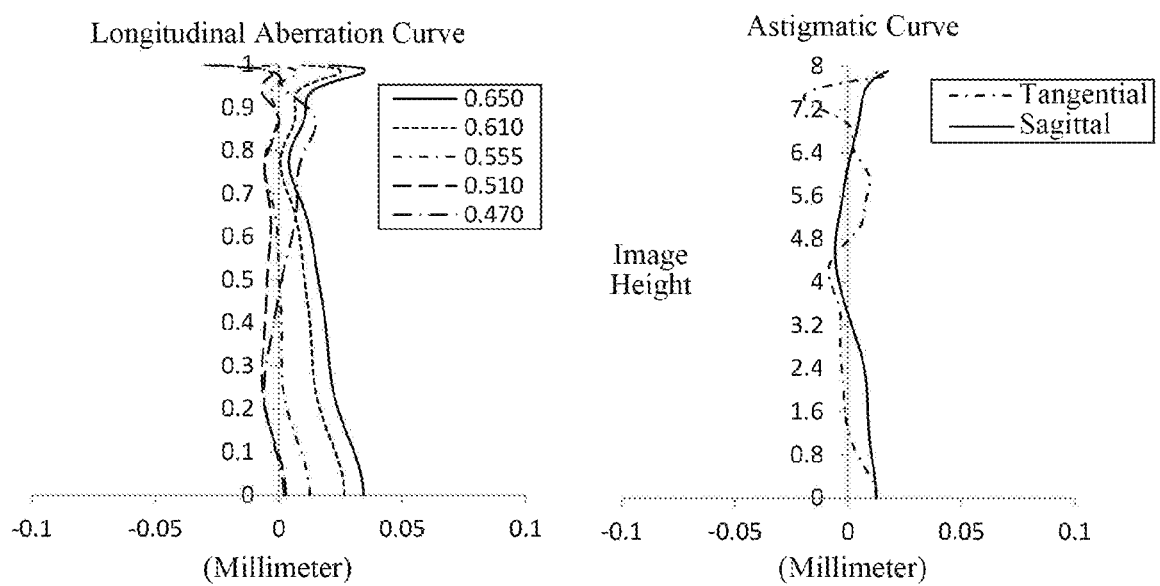
Fig. 10A
Fig. 10B

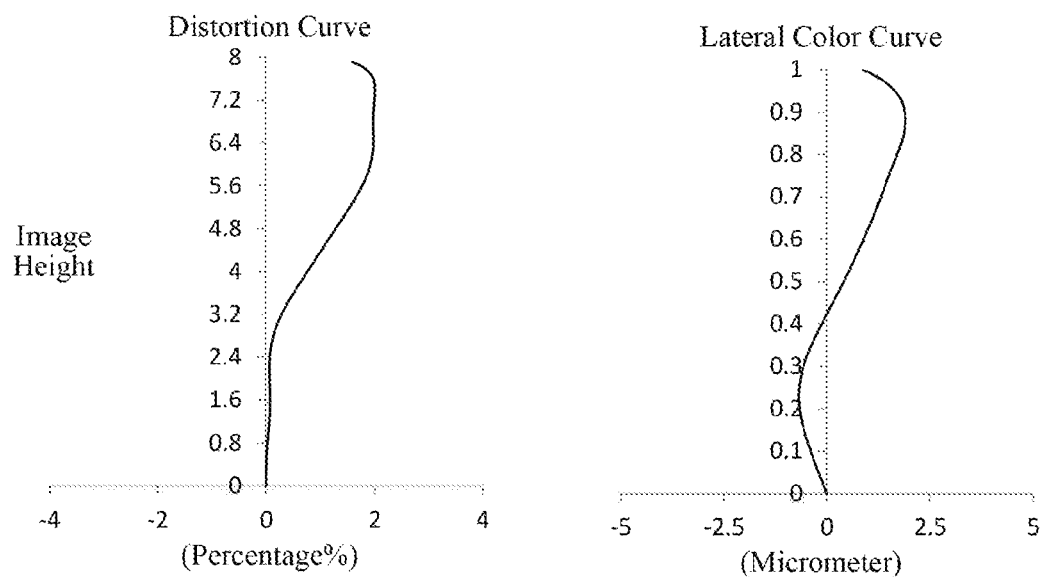
Fig. 10C
Fig. 10D
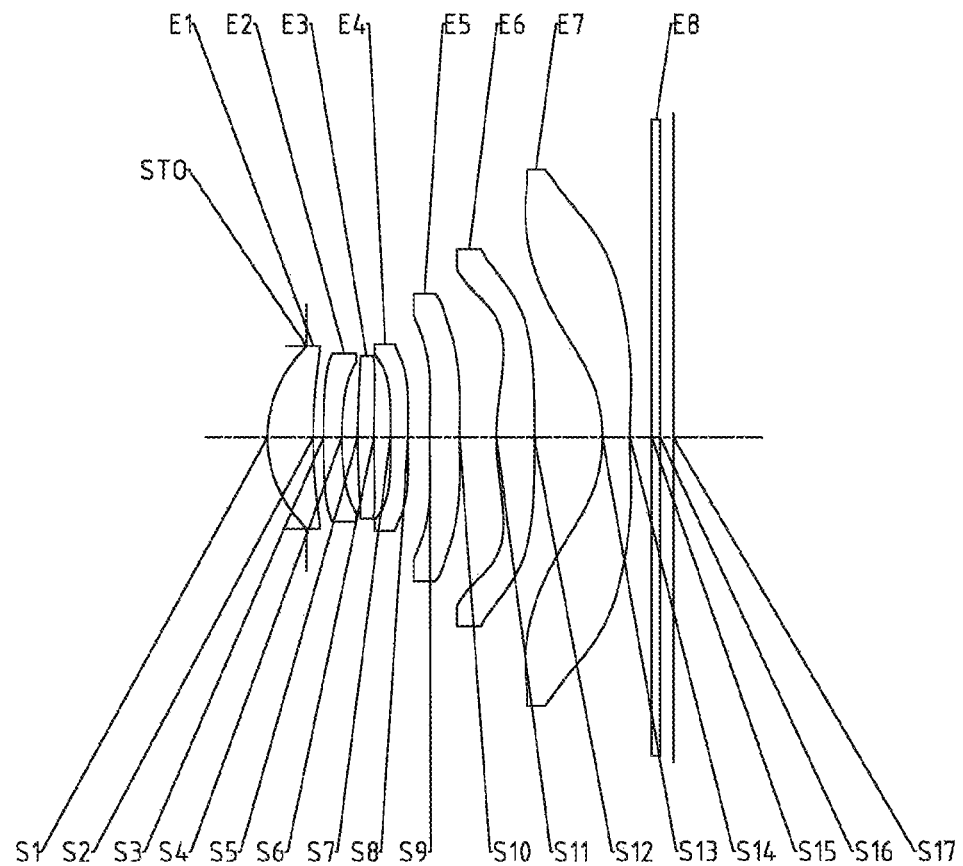
Fig. 11

OPTICAL IMAGING LENS GROUP

CROSS-REFERENCE TO RELATED APPLICATION

This application claims benefit of priority to Chinese Patent Application No. 201910926575.9 filed on Sep. 27, 2019 before the China National Intellectual Property Administration, the entire disclosure of which is incorporated herein by reference in its entity.

TECHNICAL FIELD

The present disclosure relates to the field of optical elements, and specifically, relates to an optical imaging lens group.

BACKGROUND

With the rapid development of the portable electronic products, people have put forward higher and higher demands on the image quality of the portable electronic product, such as smart phone and tablet computer. At the same time, with the continuous updating of the commonly used photosensitive element, such as photosensitive Charge-Coupled Device (CCD) and Complementary Metal-Oxide Semiconductor (CMOS) element, the imaging lens assembly used with it also needs to meet the requirements of high image quality. On the other hand, with the development of the portable electronic product, such as smart phone and tablet computer, tending to be thinner and lighter, more and more stringent demands have been put forward on the miniaturization of the optical imaging lens group applicable to the portable electronic products.

One of the problems to be solved urgently in the field of lens assembly design is how to satisfy the ultra-large imaging plane and high image quality while ensuring the characteristics of ultra-short total length.

SUMMARY

The present disclosure provides an optical imaging lens group which includes, sequentially from an object side to an image side along an optical axis, a first lens, a second lens, a third lens, a fourth lens, a fifth lens, a sixth lens and a seventh lens having refractive power. A total effective focal length f of the optical imaging lens group and half of a maximal field-of-view Semi-FOV of the optical imaging lens group may satisfy: f*tan(Semi-FOV)>7.5 mm.

In one embodiment, a distance TTL along the optical axis from an object-side surface of the first lens to an imaging plane of the optical imaging lens group and half of a diagonal length ImgH of an effective pixel area on the imaging plane of the optical imaging lens group may satisfy: TTL/ImgH<1.3.

In one embodiment, a maximum effective radius DT51 of an object-side surface of the fifth lens and a maximum effective radius DT71 of an object-side surface of the seventh lens may satisfy: 0.3<DT51/DT71<0.8.

In one embodiment, the total effective focal length f of the optical imaging lens group and an effective focal length f1 of the first lens may satisfy: 0.5<f1/f<1.0.

In one embodiment, an effective focal length f6 of the sixth lens and an effective focal length f7 of the seventh lens may satisfy: −1.0<f7/f6<0.

In one embodiment, the total effective focal length f of the optical imaging lens group, a radius of curvature R1 of an object-side surface of the first lens and a radius of curvature R2 of an image-side surface of the first lens may satisfy: 0.5<f/(R2−R1)<1.5.

In one embodiment, an effective focal length f2 of the second lens, a radius of curvature R3 of an object-side surface of the second lens and a radius of curvature R4 of an image-side surface of the second lens may satisfy: 0.5<(R4−R3)/f2<1.5.

In one embodiment, a radius of curvature R5 of an object-side surface of the third lens and a radius of curvature R6 of an image-side surface of the third lens may satisfy: 0.5<R5/R6<1.5.

In one embodiment, a radius of curvature R8 of an image-side surface of the fourth lens and a radius of curvature R9 of an object-side surface of the fifth lens may satisfy: 0.3<R9/R8<1.3.

In one embodiment, a radius of curvature R11 of an object-side surface of the sixth lens and an effective focal length f6 of the sixth lens may satisfy: 0.5<R11/f6<1.0.

In one embodiment, a radius of curvature R13 of an object-side surface of the seventh lens and a radius of curvature R14 of an image-side surface of the seventh lens may satisfy: −1.0<R13/R14<0.

In one embodiment, a center thickness CT1 of the first lens along the optical axis, a center thickness CT2 of the second lens along the optical axis, a center thickness CT3 of the third lens along the optical axis and a center thickness CT4 of the fourth lens along the optical axis may satisfy: 0.7<CT1/(CT2+CT3+CT4)<1.2.

In one embodiment, a spaced interval T12 between the first lens and the second lens along the optical axis, a spaced interval T23 between the second lens and the third lens along the optical axis and a spaced interval T34 between the third lens and the fourth lens along the optical axis may satisfy: 0.5<T23/(T12+T34)<1.

In one embodiment, a center thickness CT5 of the fifth lens along the optical axis, a center thickness CT6 of the sixth lens along the optical axis, a spaced interval T56 between the fifth lens and the sixth lens along the optical axis and a spaced interval T67 between the sixth lens and the seventh lens along the optical axis may satisfy: 0.5<(CT5+CT6)/(T56+T67)<1.0.

In one embodiment, a distance SAG61 along the optical axis from an intersection of an object-side surface of the sixth lens and the optical axis to a vertex of an effective radius of the object-side surface of the sixth lens and a distance SAG62 along the optical axis from an intersection of an image-side surface of the sixth lens and the optical axis to a vertex of an effective radius of the image-side surface of the sixth lens may satisfy: 0.5<SAG61/SAG62<1.0.

In one embodiment, a distance SAG71 along the optical axis from an intersection of an object-side surface of the seventh lens and the optical axis to a vertex of an effective radius of the object-side surface of the seventh lens and a distance SAG72 along the optical axis from an intersection of an image-side surface of the seventh lens and the optical axis to a vertex of an effective radius of the image-side surface of the seventh lens may satisfy: 0.7<SAG71/SAG72<1.2.

In one embodiment, the first lens may have positive refractive power, an object-side surface thereof may be a convex surface, and an image-side surface thereof may be a concave surface.

In one embodiment, the second lens may have negative refractive power, an object-side surface thereof may be a convex surface, and an image-side surface thereof may be a concave surface.

In one embodiment, an object-side surface of the third lens may be a convex surface, and an image-side surface thereof may be a concave surface.

In one embodiment, the fourth lens may have negative refractive power, and an image-side surface thereof may be a concave surface.

In one embodiment, an object-side surface of the fifth lens may be a convex surface.

In one embodiment, the sixth lens may have positive refractive power, and an object-side surface thereof may be a convex surface.

In one embodiment, the seventh lens may have negative refractive power, an object-side surface thereof may be a concave surface, and an image-side surface thereof may be a concave surface.

The present disclosure employs seven lenses, and the optical imaging lens group has at least one beneficial effect, such as large imaging plane, shorter optical total length, and high image quality and the like, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent by reading the detailed description of the non-limiting embodiments with reference to the accompanying drawings:

FIG. 1 illustrates a schematic structural view of an optical imaging lens group according to example 1 of the present disclosure;

FIGS. 2A to 2D illustrate a longitudinal aberration curve, an astigmatic curve, a distortion curve, and a lateral color curve of the optical imaging lens group of the example 1, respectively;

FIG. 3 illustrates a schematic structural view of an optical imaging lens group according to example 2 of the present disclosure;

FIGS. 6A to 6D illustrate a longitudinal aberration curve, an astigmatic curve, a distortion curve, and a lateral color curve of the optical imaging lens group of the example 3, respectively;

FIG. 7 illustrates a schematic structural view of an optical imaging lens group according to example 4 of the present disclosure;

FIG. 9 illustrates a schematic structural view of an optical imaging lens group according to example 5 of the present disclosure;

FIGS. 10A to 10D illustrate a longitudinal aberration curve, an astigmatic curve, a distortion curve, and a lateral color curve of the optical imaging lens group of the example 5, respectively;

FIG. 11 illustrates a schematic structural view of an optical imaging lens group according to example 6 of the present disclosure;

DETAILED DESCRIPTION OF EMBODIMENTS

Figure 4A:
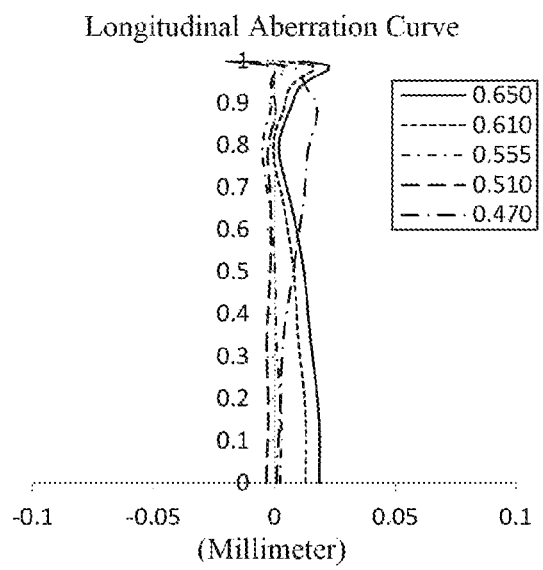
FIGS. 4A to 4D illustrate a longitudinal aberration curve, an astigmatic curve, a distortion curve, and a lateral color curve of the optical imaging lens group of the example 2, respectively.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens group according to an exemplary embodiment of the present disclosure may include seven lenses having refractive power, which are a first lens, a second lens, a third lens, a fourth lens, a fifth lens, a sixth lens and a seventh lens. The seven lenses are arranged sequentially from an object side to an image side along an optical axis. Among the first lens to the seventh lens, there may be a spaced interval between each two adjacent lenses.

In an exemplary embodiment, the first lens may have positive refractive power, an object-side surface thereof may be a convex surface, and an image-side surface thereof may be a concave surface.

In an exemplary embodiment, the second lens may have negative refractive power, an object-side surface thereof may be a convex surface, and an image-side surface thereof may be a concave surface.

In an exemplary embodiment, the third lens has positive or negative refractive power, an object-side surface thereof may be a convex surface, and an image-side surface thereof may be a concave surface.

In an exemplary embodiment, the fourth lens may have negative refractive power, and an image-side surface thereof may be a concave surface.

In an exemplary embodiment, the fifth lens has positive or negative refractive power, and an object-side surface thereof may be a convex surface.

In an exemplary embodiment, the sixth lens may have positive refractive power, and an object-side surface thereof may be a convex surface.

In an exemplary embodiment, the seventh lens may have negative refractive power, and both of an object-side surface and an image-side surface thereof may be concave surfaces.

By reasonably controlling the refractive power and surface shape of the first lens and the second lens, it is beneficial to reduce the aberration at the on-axis field-of-view of the optical imaging lens group, so that the optical imaging lens group has good imaging performance on the axis. By controlling the refractive power of the third lens, the fourth lens and the fifth lens, the surface shape of the object-side surface and image-side surface of the third lens, the surface shape of the image-side surface of the fourth lens, and the surface shape of the object-side surface of the fifth lens, it is beneficial to compensate the high-order aberrations generated by the lenses, so that each field-of-view of the optical imaging lens group has smaller aberrations. By controlling the refractive power of the sixth lens and the seventh lens, the surface shape of the object-side surface the of the sixth lens, and the surface shape of the object-side surface and image-side surface of the seventh lens, it is beneficial to match the chief ray of the optical imaging lens group with the chief ray of the imaging plane. Reasonably configuring the first lens to the seventh lens may reduce the incidence angle of the chief ray onto the imaging plane of the imaging system and improve the relative illumination of the imaging plane while ensuring the ultra-thin characteristics and large imaging plane.

In an exemplary embodiment, the optical imaging lens group according to the present disclosure may satisfy: f*tan(Semi-FOV)>7.5 mm, where f is a total effective focal length of the optical imaging lens group, and Semi-FOV is half of a maximal field-of-view of the optical imaging lens group. More specifically, f and Semi-FOV may further satisfy: f*tan(Semi-FOV)>7.7 mm Satisfying f*tan(Semi-FOV)>7.5 mm is beneficial to achieving the ultra-thin characteristics of the optical imaging lens group while making the optical imaging lens group have the characteristics of a ultra-large imaging plane.

In an exemplary embodiment, the optical imaging lens group according to the present disclosure may satisfy: TTL/ImgH<1.3, where TTL is a distance along the optical axis from an object-side surface of the first lens to an imaging plane of the optical imaging lens group, and ImgH is half of a diagonal length of an effective pixel area on the imaging plane of the optical imaging lens group. When TTL/ImgH<1.3 is satisfied, the size of the optical system may be effectively restricted, so that the optical imaging lens group has ultra-thin characteristics while satisfying the characteristics of an ultra-large imaging plane.

In an exemplary embodiment, half of a diagonal length ImgH of an effective pixel area on an imaging plane of the optical imaging lens group may satisfy ImgH≥7.5 mm. Satisfying ImgH≥7.5 mm may achieve the characteristics of large imaging plane.

In an exemplary embodiment, the optical imaging lens group according to the present disclosure may satisfy: 0.3<DT51/DT71<0.8, where DT51 is a maximum effective radius of an object-side surface of the fifth lens, and DT71 is a maximum effective radius of an object-side surface of the seventh lens. More specifically, DT51 and DT71 may further satisfy: 0.35<DT51/DT71<0.75. Satisfying 0.3<DT51/DT71<0.8 may reduce the size of the rear end of the optical imaging lens group. Under the premise of ensuring the edge field illumination of the optical imaging lens group, the light with poor image quality is eliminated, thereby ensuring excellent image quality.

In an exemplary embodiment, the optical imaging lens group according to the present disclosure may satisfy: 0.5<f1/f<1.0, where f is a total effective focal length of the optical imaging lens group, and f1 is an effective focal length of the first lens. More specifically, f1 and f may further satisfy: 0.6<f1/f<0.9. Satisfying 0.5<f1/f<1.0 may effectively control the protrusion height of the object-side surface of the first lens, ensure that enough light enters the interior of the optical imaging lens group, and ensure that the image has sufficient brightness.

In an exemplary embodiment, the optical imaging lens group according to the present disclosure may satisfy: −1.0<f7/f6<0, where f6 is an effective focal length of the sixth lens, and f7 is an effective focal length of the seventh lens. More specifically, f6 and f7 may further satisfy: −0.8<f7/f6<−0.4. Satisfying −1.0<f7/f6<0 may effectively reduce the optical sensitivity of the seventh lens and the sixth lens, which is beneficial to achieving mass production.

In an exemplary embodiment, the optical imaging lens group according to the present disclosure may satisfy: 0.5<f/(R2−R1)<1.5, where f is a total effective focal length of the optical imaging lens group, R1 is a radius of curvature of an object-side surface of the first lens, and R2 is a radius of curvature of an image-side surface of the first lens. More specifically, f, R2 and R1 may further satisfy: $0.8<f/(R2-R1)<1.0$. When $0.5<f/(R2-R1)<1.5$ is satisfied, the incident light from the object side of the first lens may be converged, thereby ensuring that sufficient light within a certain angle enters the optical imaging lens group.

In an exemplary embodiment, the optical imaging lens group according to the present disclosure may satisfy: $0.5<(R4-R3)/f2<1.5$, where f2 is an effective focal length of the second lens, R3 is a radius of curvature of an object-side surface of the second lens, and R4 is a radius of curvature of an image-side surface of the second lens. More specifically, R4, R3 and f2 may further satisfy: $0.6<(R4-R3)/f2<1.0$. When $0.5<(R4-R3)/f2<1.5$ is satisfied, the light collected by the first lens with positive refractive power may be diverged. The second lens has the function of compensating the spherical aberration of the optical imaging lens group, thereby ensuring that the spherical aberration of the entire optical imaging lens group is small.

In an exemplary embodiment, the optical imaging lens group according to the present disclosure may satisfy: $0.5<R5/R6<1.5$, where R5 is a radius of curvature of an object-side surface of the third lens, and R6 is a radius of curvature of an image-side surface of the third lens. More specifically, R5 and R6 may further satisfy: $0.6<R5/R6<1.3$. When $0.5<R5/R6<1.5$ is satisfied, the refractive power of the optical imaging lens group may be reasonably distributed, so that the positive and negative spherical aberrations of the front group lens and the rear group lens compensate each other.

In an exemplary embodiment, the optical imaging lens group according to the present disclosure may satisfy: $0.3<R9/R8<1.3$, where R8 is a radius of curvature of an image-side surface of the fourth lens, and R9 is a radius of curvature of an object-side surface of the fifth lens. More specifically, R8 and R9 may further satisfy: $0.4<R9/R8<0.9$. Satisfying $0.3<R9/R8<1.3$ may effectively compensate the on-axis aberration of the optical imaging lens group.

In an exemplary embodiment, the optical imaging lens group according to the present disclosure may satisfy: $0.5<R11/f6<1.0$, where R11 is a radius of curvature of an object-side surface of the sixth lens, and f6 is an effective focal length of the sixth lens. More specifically, R11 and f6 may further satisfy: $0.5<R11/f6<0.7$. Satisfying $0.5<R11/f6<1.0$ may effectively reduce the optical sensitivity of the sixth lens, which is beneficial to achieving mass production.

In an exemplary embodiment, the optical imaging lens group according to the present disclosure may satisfy: $-1.0<R13/R14<0$, where R13 is a radius of curvature of an object-side surface of the seventh lens, and R14 is a radius of curvature of an image-side surface of the seventh lens. More specifically, R13 and R14 may further satisfy: $-0.5<R13/R14<-0.2$. Satisfying $-1.0<R13/R14<0$ may be beneficial to ensuring that the seventh lens has appropriate refractive power, so that the light may be reasonably distributed onto the imaging plane, thereby achieving the characteristics of a ultra-large imaging plane of the optical imaging lens group.

In an exemplary embodiment, the optical imaging lens group according to the present disclosure may satisfy: $0.7<CT1/(CT2+CT3+CT4)<1.2$, where CT1 is a center thickness of the first lens along the optical axis, CT2 is a center thickness of the second lens along the optical axis, CT3 is a center thickness of the third lens along the optical axis, and CT4 is a center thickness of the fourth lens along the optical axis. More specifically, CT1, CT2, CT3 and CT4 may further satisfy: $0.8<CT1/(CT2+CT3+CT4)<1.0$. Satisfying $0.7<CT1/(CT2+CT3+CT4)<1.2$ may be beneficial to ensuring the assembly process of the optical imaging lens group, and achieving the ultra-thin characteristics of the optical imaging lens group, which is beneficial to meeting the needs of the overall assembly.

In an exemplary embodiment, the optical imaging lens group according to the present disclosure may satisfy: $0.5<T23/(T12+T34)<1$, where T12 is a spaced interval between the first lens and the second lens along the optical axis, T23 is a spaced interval between the second lens and the third lens along the optical axis, and T34 is a spaced interval between the third lens and the fourth lens along the optical axis. More specifically, T12, T23 and T34 may further satisfy: $0.5<T23/(T12+T34)<0.85$. Satisfying $0.5<T23/(T12+T34)<1$ may reduce the sensitivity of the air interval in the optical imaging lens group, so as to ensure that the optical imaging lens group has better image quality and facilitate the mass production.

In an exemplary embodiment, the optical imaging lens group according to the present disclosure may satisfy: $0.5<(CT5+CT6)/(T56+T67)<1.0$, where CT5 is a center thickness of the fifth lens along the optical axis, CT6 is a center thickness of the sixth lens along the optical axis, T56 is a spaced interval between the fifth lens and the sixth lens along the optical axis, and T67 is a spaced interval between the sixth lens and the seventh lens along the optical axis. More specifically, CT5, CT6, T56 and T67 may further satisfy: $0.5<(CT5+CT6)/(T56+T67)<0.8$. Satisfying $0.5<(CT5+CT6)/(T56+T67)<1.0$ may improve the stability of optical imaging lens assembly, and may improve the stability of injection molding of optical imaging lens group, thereby increasing the production yield of the optical imaging lens group.

In an exemplary embodiment, the optical imaging lens group according to the present disclosure may satisfy: $0.5<SAG61/SAG62<1.0$, where SAG61 is a distance along the optical axis from an intersection of an object-side surface of the sixth lens and the optical axis to a vertex of an effective radius of the object-side surface of the sixth lens, and SAG62 is a distance along the optical axis from an intersection of an image-side surface of the sixth lens and the optical axis to a vertex of an effective radius of the image-side surface of the sixth lens. More specifically, SAG61 and SAG62 may further satisfy: $0.6<SAG61/SAG62<0.8$. When $0.5<SAG61/SAG62<1.0$ is satisfied, the incident angle of the chief ray on the image-side surface of the sixth lens may be effectively reduced, thereby improving the matching degree between the optical imaging lens group and the chip.

In an exemplary embodiment, the optical imaging lens group according to the present disclosure may satisfy: $0.7<SAG71/SAG72<1.2$, where SAG71 is a distance along the optical axis from an intersection of an object-side surface of the seventh lens and the optical axis to a vertex of an effective radius of the object-side surface of the seventh lens, and SAG72 is a distance along the optical axis from an intersection of an image-side surface of the seventh lens and the optical axis to a vertex of an effective radius of the image-side surface of the seventh lens. More specifically, SAG71 and SAG72 may further satisfy: $0.8<SAG71/SAG72<1.0$. By satisfying $0.7<SAG71/SAG72<1.2$ is beneficial for the optical imaging lens group to have a relative high illumination, even when the chief ray is incident onto the imaging plane at a small incident angle. At the same time, it is beneficial for the seventh lens to have better workability.

In an exemplary embodiment, the optical imaging lens group according to the present disclosure further includes a stop disposed between the object side and the first lens.

Optionally, the above optical imaging lens group may further include an optical filter for correcting the color deviation and/or a protective glass for protecting the photosensitive element located on an imaging plane.

The optical imaging lens group according to the above embodiments of the present disclosure may employ a plurality of lenses, such as seven lenses as described above. By properly configuring the refractive power of each lens, the surface shape, the center thickness of each lens, and spaced intervals along the optical axis between the lenses, the size of the optical imaging lens group may be effectively reduced, and the workability of the optical imaging lens group may be improved, such that the optical imaging lens group is more advantageous for production processing and may be applied to portable electronic products. The optical imaging lens group configured as described above may achieve the characteristics of ultra-short total system length and good image quality while ensuring a large imaging plane.

In the embodiments of the present disclosure, at least one of the surfaces of lenses is aspheric, that is, at least one of the object-side surface of the first lens to the image-side surface of the seventh lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens, the sixth lens and the seventh lens is aspheric. Optionally, the object-side surface and the image-side surface of each of the first lens, the second lens, the third lens, the fourth lens, the fifth lens, the sixth lens and the seventh lens are aspheric.

However, it will be understood by those skilled in the art that the number of lenses constituting the optical imaging lens group may be varied to achieve the various results and advantages described in this specification without departing from the technical solution claimed by the present disclosure. For example, although the embodiment is described by taking seven lenses as an example, the optical imaging lens group is not limited to include seven lenses. The optical imaging lens group may also include other numbers of lenses if desired.

Some specific examples of an optical imaging lens group applicable to the above embodiment will be further described below with reference to the accompanying drawings.

Example 1

An optical imaging lens group according to example 1 of the present disclosure is described below with reference to FIG. 1 to FIG. 2D. FIG. 1 shows a schematic structural view of the optical imaging lens group according to example 1 of the present disclosure.

As shown in FIG. 1, the optical imaging lens group includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 1 is a table illustrating basic parameters of the optical imaging lens group of example 1, wherein the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.9644 | | | | |
| S1 | Aspheric | 3.0826 | 1.1194 | 1.55 | 56.1 | 7.17 | −4.6712 |
| S2 | Aspheric | 12.6565 | 0.2070 | | | | 14.6944 |
| S3 | Aspheric | 18.7427 | 0.4611 | 1.67 | 19.2 | −18.15 | 52.6837 |
| S4 | Aspheric | 7.3519 | 0.3910 | | | | 4.5428 |
| S5 | Aspheric | 14.8319 | 0.4076 | 1.55 | 56.1 | 87.56 | 54.6633 |
| S6 | Aspheric | 21.2958 | 0.4522 | | | | 99.0000 |
| S7 | Aspheric | −173.5210 | 0.4603 | 1.67 | 20.4 | −45.27 | −99.0000 |
| S8 | Aspheric | 36.5598 | 0.5638 | | | | 95.3190 |
| S9 | Aspheric | 21.3066 | 0.7222 | 1.65 | 23.5 | −144.37 | 44.8065 |
| S10 | Aspheric | 17.1068 | 0.7746 | | | | −99.0000 |
| S11 | Aspheric | 6.1436 | 0.9426 | 1.55 | 56.1 | 9.91 | −3.5621 |

TABLE 1-continued

| Surface number | Surface type | Radius of curvature | Thickness/ Distance | Material Refractive index | Abbe number | Focal length | Conic coefficient |
|---|---|---|---|---|---|---|---|
| S12 | Aspheric | −42.8565 | 1.7173 | | | | 33.8538 |
| S13 | Aspheric | −4.3136 | 0.6821 | 1.54 | 55.9 | −5.77 | −3.4244 |
| S14 | Aspheric | 11.6051 | 0.5469 | | | | −99.0000 |
| S15 | Spherical | Infinite | 0.2100 | 1.52 | 64.2 | | |
| S16 | Spherical | Infinite | 0.3344 | | | | |
| S17 | Spherical | Infinite | | | | | |

In this example, a total effective focal length f of the optical imaging lens group is 9.03 mm, a total length TTL of the optical imaging lens group (that is, a distance along the optical axis from the object-side surface S1 of the first lens E1 to the imaging plane S17 of the optical imaging lens group) is 9.99 mm, half of a diagonal length ImgH of an effective pixel area on the imaging plane S17 of the optical imaging lens group is 8.00 mm, half of a maximal field-of-view Semi-FOV of the optical imaging lens group is 41.3°, and a ratio f/EPD of the total effective focal length f to an entrance pupil diameter EPD is 2.00.

In example 1, the object-side surface and the image-side surface of any one of the first lens E1 to the seventh lens E7 are aspheric. The surface shape x of each aspheric lens may be defined by using, but not limited to, the following aspheric formula:

$$x = \frac{ch^2}{1 + \sqrt{1 - (k+1)c^2 h^2}} + \Sigma A_i h^i \qquad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S14 in example 1.

FIG. 2A illustrates a longitudinal aberration curve of the optical imaging lens group according to example 1, representing deviations of focal points converged by light of different wavelengths after passing through the lens assembly. FIG. 2B illustrates an astigmatic curve of the optical imaging lens group according to example 1, representing a curvature of a tangential plane and a curvature of a sagittal plane. FIG. 2C illustrates a distortion curve of the optical imaging lens group according to example 1, representing amounts of distortion corresponding to different image heights. FIG. 2D illustrates a lateral color curve of the optical imaging lens group according to example 1, representing deviations of different image heights on an imaging plane after light passes through the lens assembly. It can be seen from FIG. 2A to FIG. 2D that the optical imaging lens group provided in example 1 may achieve good image quality.

Example 2

An optical imaging lens group according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging lens group according to example 2 of the present disclosure.

As shown in FIG. 3, the optical imaging lens group includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4

TABLE 2

| Surface number | A4 | A6 | A8 | A10 | A12 | A14 | A16 | A18 | A20 |
|---|---|---|---|---|---|---|---|---|---|
| S1 | 2.0445E−02 | −2.7991E−03 | 7.8046E−04 | −1.7870E−04 | 2.2991E−05 | 3.0187E−06 | −1.9911E−06 | 3.4221E−07 | −2.2723E−08 |
| S2 | −2.4528E−03 | 1.3154E−03 | −1.4571E−03 | 1.1729E−03 | −6.0681E−04 | 1.9447E−04 | −3.7494E−05 | 3.9805E−06 | −1.8011E−07 |
| S3 | −1.4922E−03 | 1.6743E−03 | −5.3352E−04 | 3.5773E−04 | −2.0569E−04 | 8.0921E−05 | −1.8640E−05 | 2.3145E−06 | −1.1978E−07 |
| S4 | 1.4728E−04 | 2.7439E−03 | −1.7494E−03 | 1.5709E−03 | −8.6881E−04 | 3.0107E−04 | −5.7943E−05 | 5.3342E−06 | −1.1210E−07 |
| S5 | −7.9509E−03 | 1.2422E−03 | −2.3718E−03 | 2.5091E−03 | −1.7370E−03 | 7.6294E−04 | −2.0676E−04 | 3.1775E−05 | −2.1418E−06 |
| S6 | −7.6853E−03 | 4.1802E−03 | 2.4856E−04 | −9.3698E−04 | 7.8995E−04 | −3.4700E−04 | 8.2256E−05 | −9.6940E−06 | 3.9501E−07 |
| S7 | −1.9923E−02 | 3.4320E−03 | −5.2139E−03 | 4.7863E−03 | −3.0295E−03 | 1.2379E−03 | −3.1296E−04 | 4.4357E−05 | −2.6868E−06 |
| S8 | −2.0710E−02 | 5.5262E−03 | −4.8233E−03 | 2.9196E−03 | −1.2406E−03 | 3.5227E−04 | −6.2947E−05 | 6.4022E−06 | −2.7838E−07 |
| S9 | −1.8236E−02 | 5.1634E−03 | −1.4809E−03 | 2.6597E−04 | −3.6778E−05 | 4.4147E−06 | −4.7190E−07 | 3.7399E−08 | −1.3843E−09 |
| S10 | −2.0661E−02 | 5.2106E−03 | −1.0365E−03 | 1.4379E−04 | −1.4081E−05 | 9.8566E−07 | −4.9622E−08 | 1.8284E−09 | −3.9572E−11 |
| S11 | −1.1112E−02 | 4.0636E−04 | −3.7982E−05 | 1.9256E−05 | −5.9044E−06 | 7.8618E−07 | −5.4900E−08 | 2.0704E−09 | −3.3732E−11 |
| S12 | −2.4410E−04 | −1.2428E−03 | 1.8995E−04 | −2.4769E−06 | −3.0430E−06 | 4.1541E−07 | −2.4588E−08 | 7.0386E−10 | −7.9547E−12 |
| S13 | −1.9194E−02 | 3.0113E−03 | −2.2928E−04 | 1.0973E−05 | −3.4911E−07 | 7.3559E−09 | −9.7910E−11 | 7.3605E−13 | −2.3362E−15 |
| S14 | −1.1884E−02 | 1.5255E−03 | −1.1522E−04 | 5.2411E−06 | −1.4029E−07 | 1.7532E−09 | 5.5105E−12 | −3.9265E−13 | 2.9892E−15 | thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 optical imaging lens group is 41.5°, and a ratio f/EPD of the total effective focal length f to an entrance pupil diameter EPD is 1.97.

Table 3 is a table illustrating basic parameters of the optical imaging lens group of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.9605 | | | | |
| S1 | Aspheric | 3.1004 | 1.1150 | 1.55 | 56.1 | 7.17 | −4.7254 |
| S2 | Aspheric | 13.0395 | 0.2156 | | | | 15.6388 |
| S3 | Aspheric | 19.2881 | 0.4471 | 1.67 | 19.2 | −17.92 | 54.5957 |
| S4 | Aspheric | 7.3805 | 0.3983 | | | | 4.6796 |
| S5 | Aspheric | 14.8465 | 0.4031 | 1.55 | 56.1 | 94.06 | 54.1233 |
| S6 | Aspheric | 20.6847 | 0.4500 | | | | 98.7361 |
| S7 | Aspheric | 90.0000 | 0.4392 | 1.67 | 20.4 | −53.17 | 99.0000 |
| S8 | Aspheric | 25.3760 | 0.6064 | | | | 31.8613 |
| S9 | Aspheric | 20.8641 | 0.7631 | 1.65 | 23.5 | −88.02 | 45.2624 |
| S10 | Aspheric | 15.0359 | 0.7556 | | | | −92.4672 |
| S11 | Aspheric | 5.9046 | 1.0170 | 1.55 | 56.1 | 9.39 | −3.6312 |
| S12 | Aspheric | −36.6045 | 1.6682 | | | | 33.5435 |
| S13 | Aspheric | −4.4117 | 0.6651 | 1.54 | 55.9 | −5.69 | −3.7922 |
| S14 | Aspheric | 10.4516 | 0.5258 | | | | −73.7106 |
| S15 | Spherical | Infinite | 0.2100 | 1.52 | 64.2 | | |
| S16 | Spherical | Infinite | 0.3136 | | | | |
| S17 | Spherical | Infinite | | | | | |

TABLE 4

| Surface number | A4 | A6 | A8 | A10 | A12 | A14 | A16 | A18 | A20 |
|---|---|---|---|---|---|---|---|---|---|
| S1 | 2.0151E−02 | −2.4368E−03 | 3.2754E−04 | 1.4688E−04 | −1.2170E−04 | 4.3072E−05 | −8.7110E−06 | 9.6706E−07 | −4.7169E−08 |
| S2 | −2.2541E−03 | 1.1258E−03 | −1.1580E−03 | 9.1949E−04 | −4.8095E−04 | 1.5632E−04 | −3.0522E−05 | 3.2740E−06 | −1.4946E−07 |
| S3 | −1.2804E−03 | 1.9246E−03 | −7.6088E−04 | 4.8822E−04 | −2.6038E−04 | 9.6815E−05 | −2.1669E−05 | 2.6443E−06 | −1.3507E−07 |
| S4 | 5.4741E−04 | 1.9604E−03 | −1.1400E−05 | −4.3763E−04 | 5.0259E−04 | −2.7580E−04 | 8.8424E−05 | −1.5261E−05 | 1.1169E−06 |
| S5 | −7.7701E−03 | 1.1283E−03 | −1.4391E−03 | 1.2171E−03 | −7.5490E−04 | 3.1218E−04 | −8.2396E−05 | 1.2662E−05 | −8.7740E−07 |
| S6 | −8.2950E−03 | 2.2260E−03 | −2.5705E−03 | 1.9914E−03 | −1.1099E−03 | 4.1352E−04 | −1.0016E−04 | 1.4225E−05 | −9.1582E−07 |
| S7 | −2.1049E−03 | 5.4161E−03 | −7.0806E−03 | 5.9933E−03 | −3.5163E−03 | 1.3472E−03 | −3.2198E−04 | 4.3360E−05 | −2.5040E−06 |
| S8 | −2.1278E−02 | 6.2808E−03 | −5.3236E−03 | 3.1967E−03 | −1.3557E−03 | 3.8448E−04 | −6.8688E−05 | 6.9808E−06 | −3.0353E−07 |
| S9 | −1.7942E−02 | 4.7858E−03 | −1.2327E−03 | 1.7897E−04 | −1.5936E−05 | 9.3918E−07 | −1.0664E−07 | 1.6069E−08 | −8.5945E−10 |
| S10 | −1.9734E−02 | 4.5946E−03 | −8.1488E−04 | 9.4365E−05 | −6.6270E−06 | 2.0055E−07 | 5.2299E−09 | −4.5261E−10 | 3.7608E−12 |
| S11 | −9.8796E−03 | 1.9869E−04 | 4.9115E−05 | −4.4360E−06 | −1.3282E−06 | 2.4383E−07 | −1.7482E−08 | 6.4811E−10 | −1.0395E−11 |
| S12 | 1.1100E−03 | −1.4339E−03 | 2.4392E−04 | −1.5229E−05 | −8.3553E−07 | 1.8437E−07 | −1.1176E−08 | 3.0505E−10 | −3.2068E−12 |
| S13 | −1.8685E−02 | 2.8785E−03 | −2.1523E−04 | 1.0137E−05 | −3.1993E−07 | 6.7816E−09 | −9.2749E−11 | 7.3934E−13 | −2.6085E−15 |
| S14 | −1.1512E−02 | 1.5148E−03 | −1.1736E−04 | 5.5688E−06 | −1.6419E−07 | 2.8137E−09 | −2.2432E−11 | −1.7119E−15 | 7.8482E−16 | thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Figure 4B:
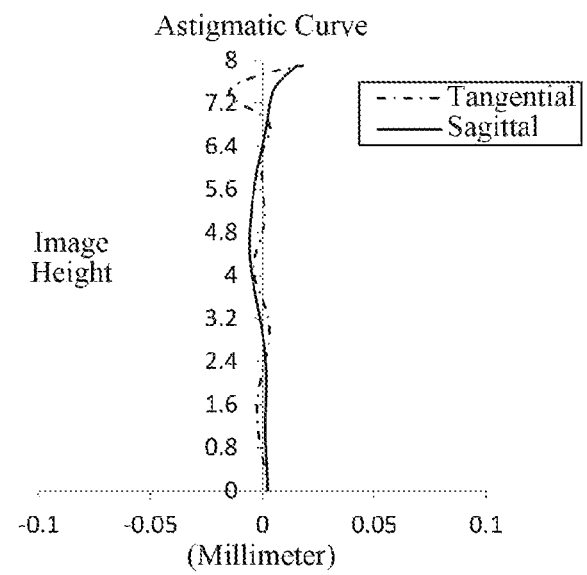
Figure 4C:
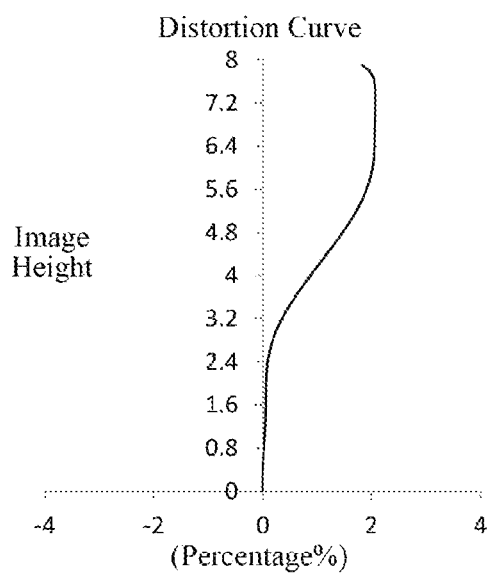
Figure 4D:
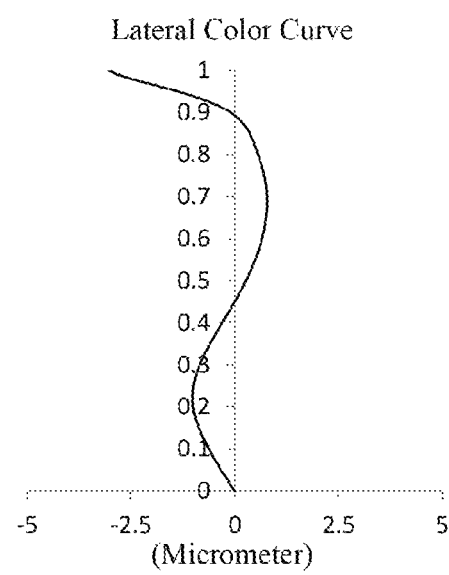

In this example, a total effective focal length f of the optical imaging lens group is 8.90 mm, a total length TTL of the optical imaging lens group is 9.99 mm, half of a diagonal length ImgH of an effective pixel area on the imaging plane S17 of the optical imaging lens group is 7.82 mm, half of a maximal field-of-view Semi-FOV of the FIG. 4A illustrates a longitudinal aberration curve of the optical imaging lens group according to example 2, representing deviations of focal points converged by light of different wavelengths after passing through the lens assembly. FIG. 4B illustrates an astigmatic curve of the optical imaging lens group according to example 2, representing a curvature of a tangential plane and a curvature of a sagittal plane. FIG. 4C illustrates a distortion curve of the optical imaging lens group according to example 2, representing amounts of distortion corresponding to different image heights. FIG. 4D illustrates a lateral color curve of the optical imaging lens group according to example 2, representing deviations of different image heights on an imaging plane after light passes through the lens assembly. It can be seen from FIG. 4A to FIG. 4D that the optical imaging lens group provided in example 2 may achieve good image quality.

Example 3

Figure 5:
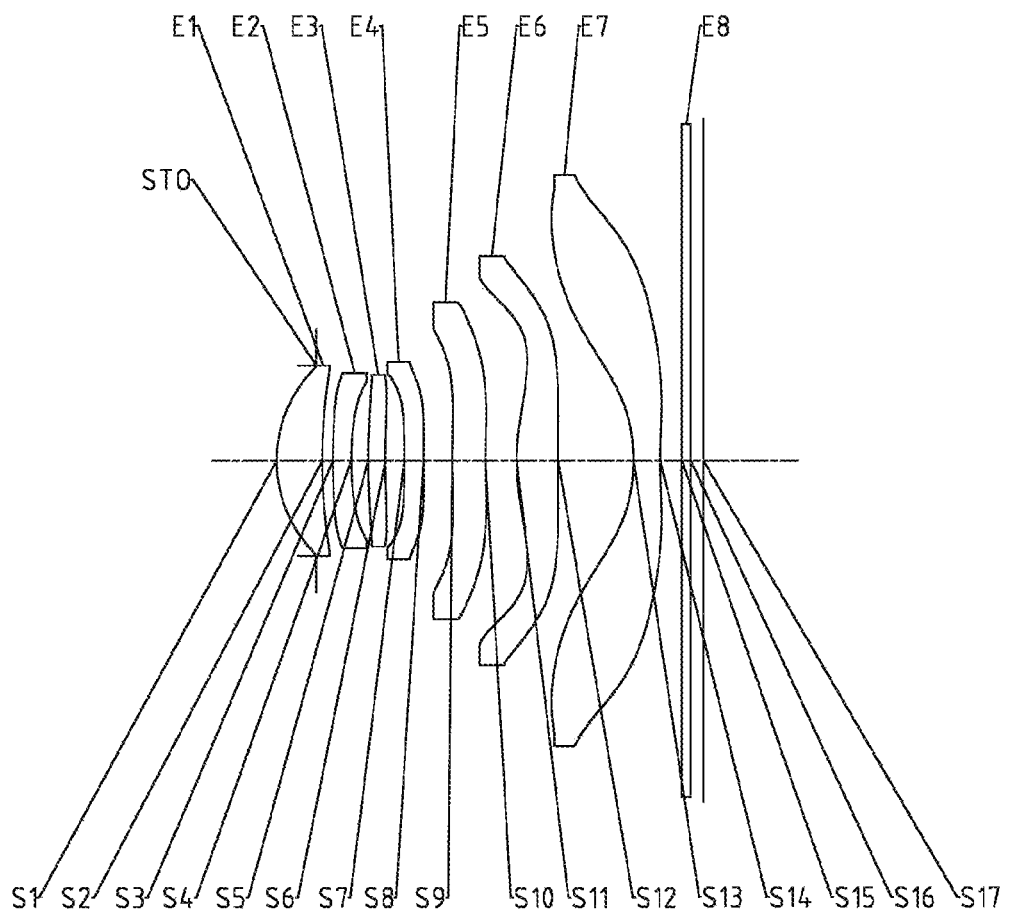
FIG. 5 illustrates a schematic structural view of an optical imaging lens group according to example 3 of the present disclosure.

An optical imaging lens group according to example 3 of the present disclosure is described below with reference to FIG. 5 to FIG. 6D. FIG. 5 shows a schematic structural view of the optical imaging lens group according to example 3 of the present disclosure.

As shown in FIG. 5, the optical imaging lens group includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens group is 8.90 mm, a total length TTL of the optical imaging lens group is 9.99 mm, half of a diagonal length ImgH of an effective pixel area on the imaging plane S17 of the optical imaging lens group is 8.00 mm, half of a maximal field-of-view Semi-FOV of the optical imaging lens group is 41.5°, and a ratio f/EPD of the total effective focal length f to an entrance pupil diameter EPD is 2.00.

Table 5 is a table illustrating basic parameters of the optical imaging lens group of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Refractive index | Abbe number | Focal length | Conic coefficient |
| --- | --- | --- | --- | --- | --- | --- | --- |
| OBJ | Spherical | Infinite | Infinite | | | | |
| STO | Spherical | Infinite | −0.9299 | | | | |
| S1 | Aspheric | 3.1018 | 1.0689 | 1.55 | 56.1 | 7.18 | −4.7168 |
| S2 | Aspheric | 13.0542 | 0.2503 | | | | 16.9106 |
| S3 | Aspheric | 18.5734 | 0.4278 | 1.67 | 19.2 | −17.61 | 56.7243 |
| S4 | Aspheric | 7.1961 | 0.3969 | | | | 4.9397 |
| S5 | Aspheric | 14.6301 | 0.4037 | 1.55 | 56.1 | 90.28 | 52.6657 |
| S6 | Aspheric | 20.6034 | 0.4400 | | | | 99.0000 |
| S7 | Aspheric | −619.8996 | 0.4493 | 1.67 | 20.4 | −54.43 | −99.0000 |
| S8 | Aspheric | 38.5393 | 0.6734 | | | | 99.0000 |
| S9 | Aspheric | 20.6011 | 0.7798 | 1.65 | 23.5 | −69.93 | 37.9902 |
| S10 | Aspheric | 13.9294 | 0.7308 | | | | −95.7248 |
| S11 | Aspheric | 5.0512 | 0.9721 | 1.55 | 56.1 | 9.48 | −3.9879 |
| S12 | Aspheric | 200.0000 | 1.7652 | | | | 64.0265 |
| S13 | Aspheric | −4.4234 | 0.6261 | 1.54 | 55.9 | −5.86 | −4.7457 |
| S14 | Aspheric | 11.4279 | 0.5054 | | | | −99.0000 |
| S15 | Spherical | Infinite | 0.2100 | 1.52 | 64.2 | | |
| S16 | Spherical | Infinite | 0.2930 | | | | |
| S17 | Spherical | Infinite | | | | | |

TABLE 6

| Surface number | A4 | A6 | A8 | A10 | A12 | A14 | A16 | A18 | A20 |
| --- | --- | --- | --- | --- | --- | --- | --- | --- | --- |
| S1 | 2.0178E−02 | −2.4848E−03 | 3.5211E−04 | 1.6970E−04 | −1.5382E−04 | 5.9226E−05 | −1.2895E−05 | 1.5276E−06 | −7.8036E−08 |
| S2 | −1.5794E−03 | 8.3893E−04 | −1.0319E−03 | 8.6824E−04 | −4.6866E−04 | 1.5686E−04 | −3.1587E−05 | 3.4998E−06 | −1.6553E−07 |
| S3 | −1.9156E−04 | 1.3390E−03 | −4.1114E−04 | 2.8826E−04 | −1.7060E−04 | 7.1024E−05 | −1.7430E−05 | 2.2840E−06 | −1.2357E−07 |
| S4 | 9.3756E−04 | 2.1161E−03 | −9.1988E−04 | 7.5324E−04 | −3.4745E−04 | 9.0330E−05 | −5.0279E−06 | −2.3619E−06 | 3.8098E−07 |
| S5 | −7.0412E−03 | 1.7767E−04 | 7.6077E−05 | −4.0482E−04 | 3.8257E−04 | −1.9522E−04 | 5.6408E−05 | −8.5690E−06 | 5.1035E−07 |
| S6 | −7.5520E−03 | 1.5917E−03 | −1.7856E−03 | 1.3012E−03 | −6.8028E−04 | 2.3568E−04 | −5.4214E−05 | 7.5310E−06 | −4.9930E−07 |
| S7 | −2.0153E−02 | 2.9446E−03 | −4.1027E−03 | 3.5323E−03 | −2.1582E−03 | 8.6421E−04 | −2.1635E−04 | 3.0506E−05 | −1.8404E−06 |
| S8 | −1.9924E−02 | 4.8085E−03 | −4.4530E−03 | 2.8767E−03 | −1.2871E−03 | 3.8095E−04 | −7.0509E−05 | 7.3934E−06 | −3.3104E−07 |
| S9 | −1.5918E−02 | 4.3540E−03 | −1.0933E−03 | 1.1680E−04 | 7.2197E−06 | −4.2831E−06 | 5.9156E−07 | −3.5782E−08 | 7.8634E−10 |
| S10 | −1.9088E−02 | 4.7314E−03 | −8.7146E−04 | 1.0046E−04 | −6.2281E−06 | 1.7674E−08 | 2.6578E−08 | −1.6491E−09 | 3.1629E−11 |
| S11 | −9.8383E−03 | 3.6410E−04 | 7.8161E−05 | −2.2333E−05 | 2.4319E−06 | −1.8689E−07 | 1.0716E−08 | −3.5589E−10 | 4.7974E−12 |

TABLE 6-continued

| Surface number | A4 | A6 | A8 | A10 | A12 | A14 | A16 | A18 | A20 |
|---|---|---|---|---|---|---|---|---|---|
| S12 | 1.0580E−03 | −1.6704E−03 | 3.5484E−04 | −3.9080E−05 | 2.1778E−06 | −5.0930E−08 | −2.1473E−10 | 2.8544E−11 | −3.1178E−13 |
| S13 | −1.9934E−02 | 3.0637E−03 | −2.2882E−04 | 1.0558E−05 | −3.1860E−07 | 6.2950E−09 | −7.8130E−11 | 5.4851E−13 | −1.6445E−15 |
| S14 | −1.1230E−02 | 1.3962E−03 | −9.4175E−05 | 3.2730E−06 | −3.3982E−08 | −1.5735E−09 | 6.4061E−11 | −9.2108E−13 | 4.8470E−15 |

Figure 6A:
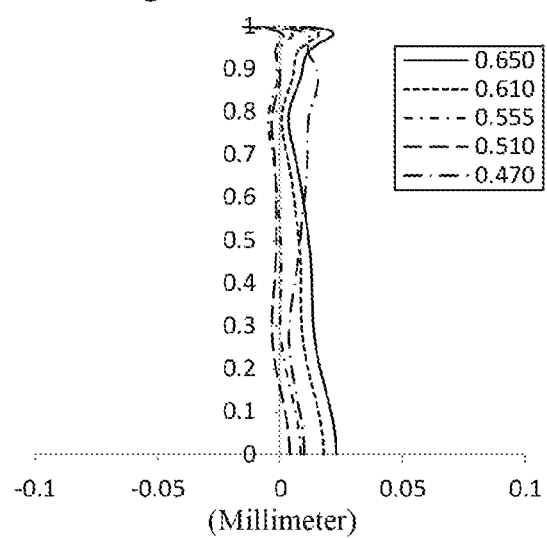
Figure 6B:
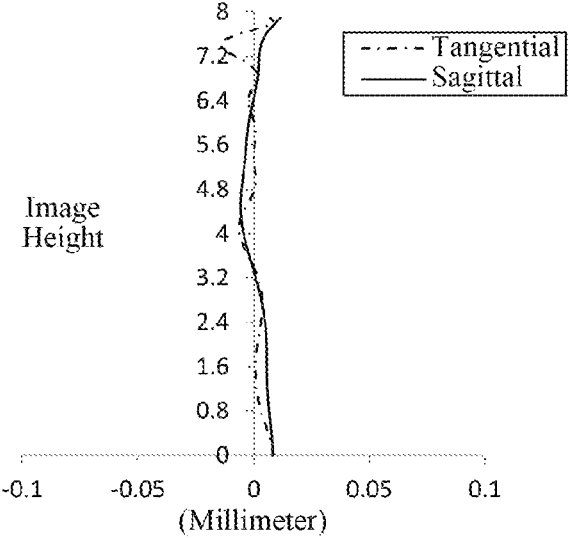

FIG. 6A illustrates a longitudinal aberration curve of the optical imaging lens group according to example 3, representing deviations of focal points converged by light of different wavelengths after passing through the lens assembly. FIG. 6B illustrates an astigmatic curve of the optical imaging lens group according to example 3, representing a curvature of a tangential plane and a curvature of a sagittal plane. FIG. 6C illustrates a distortion curve of the optical imaging lens group according to example 3, representing amounts of distortion corresponding to different image heights. FIG. 6D illustrates a lateral color curve of the optical imaging lens group according to example 3, representing deviations of different image heights on an imaging plane after light passes through the lens assembly. It can be seen from FIG. 6A to FIG. 6D that the optical imaging lens group provided in example 3 may achieve good image quality.

Example 4

An optical imaging lens group according to example 4 of the present disclosure is described below with reference to FIG. 7 to FIG. 8D. FIG. 7 shows a schematic structural view of the optical imaging lens group according to example 4 of the present disclosure.

As shown in FIG. 7, the optical imaging lens group includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens group is 8.90 mm, a total length TTL of the optical imaging lens group is 9.99 mm, half of a diagonal length ImgH of an effective pixel area on the imaging plane S17 of the optical imaging lens group is 8.00 mm, half of a maximal field-of-view Semi-FOV of the optical imaging lens group is 41.5°, and a ratio f/EPD of the total effective focal length f to an entrance pupil diameter EPD is 1.97.

Table 7 is a table illustrating basic parameters of the optical imaging lens group of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (1) given in the above example 1.

TABLE 7

| Surface number | Surface type | Radius of curvature | Thickness/ Distance | Material | | Focal length | Conic coefficient |
| | | | | Refractive index | Abbe number | | |
|---|---|---|---|---|---|---|---|
| OBJ | Spherical | Infinite | Infinite | | | | |
| STO | Spherical | Infinite | −0.9481 | | | | |
| S1 | Aspheric | 3.1168 | 1.0942 | 1.55 | 56.1 | 7.19 | −4.7669 |
| S2 | Aspheric | 13.2606 | 0.2515 | | | | 16.9523 |
| S3 | Aspheric | 19.2222 | 0.4149 | 1.67 | 19.2 | −17.49 | 57.7746 |
| S4 | Aspheric | 7.2668 | 0.3967 | | | | 4.8453 |
| S5 | Aspheric | 14.7157 | 0.4076 | 1.55 | 56.1 | 90.83 | 52.8435 |
| S6 | Aspheric | 20.7206 | 0.4385 | | | | 98.9463 |
| S7 | Aspheric | 215.7908 | 0.4464 | 1.67 | 20.4 | −59.18 | −49.5000 |
| S8 | Aspheric | 33.3190 | 0.6934 | | | | 74.8589 |
| S9 | Aspheric | 19.7999 | 0.7693 | 1.65 | 23.5 | −60.16 | 33.5964 |
| S10 | Aspheric | 12.9079 | 0.7070 | | | | −96.6010 |
| S11 | Aspheric | 4.9790 | 0.9745 | 1.55 | 56.1 | 9.31 | −3.9098 |
| S12 | Aspheric | 230.0000 | 1.7593 | | | | 49.5000 |
| S13 | Aspheric | −4.3543 | 0.6444 | 1.54 | 55.9 | −5.80 | −4.7833 |
| S14 | Aspheric | 11.4616 | 0.4987 | | | | −95.6033 |

TABLE 7-continued

| Surface number | Surface type | Radius of curvature | Thickness/ Distance | Material Refractive index | Abbe number | Focal length | Conic coefficient |
|---|---|---|---|---|---|---|---|
| S15 | Spherical | Infinite | 0.2100 | 1.52 | 64.2 | | |
| S16 | Spherical | Infinite | 0.2864 | | | | |
| S17 | Spherical | Infinite | | | | | |

TABLE 8

| Surface number | A4 | A6 | A8 | A10 | A12 | A14 | A16 | A18 | A20 |
|---|---|---|---|---|---|---|---|---|---|
| S1 | 2.0053E−02 | −2.4745E−03 | 3.3756E−04 | 1.6491E−04 | −1.4277E−04 | 5.2908E−05 | −1.1113E−05 | 1.2720E−06 | −6.2952E−08 |
| S2 | −1.5625E−03 | 8.9377E−04 | −1.1400E−03 | 9.4728E−04 | −5.0017E−04 | 1.6361E−04 | −3.2204E−05 | 3.4885E−06 | −1.6104E−07 |
| S3 | −4.9092E−05 | 1.2732E−03 | −3.8304E−04 | 2.7355E−04 | −1.6038E−04 | 6.6193E−05 | −1.6098E−05 | 2.0933E−06 | −1.1234E−07 |
| S4 | 1.0919E−03 | 1.8973E−03 | −5.4566E−04 | 2.6030E−04 | 3.8661E−05 | −9.1217E−05 | 4.4996E−05 | −9.8007E−06 | 8.3863E−07 |
| S5 | −6.7182E−03 | 3.0570E−04 | −2.7803E−04 | −1.3557E−06 | 9.9188E−05 | −7.0109E−05 | 2.2647E−05 | −3.5112E−06 | 1.8961E−07 |
| S6 | −7.1787E−03 | 1.4876E−03 | −1.6881E−03 | 1.2410E−03 | −6.5984E−04 | 2.3240E−04 | −5.3934E−05 | 7.4589E−06 | −4.8556E−07 |
| S7 | −1.9667E−02 | 2.3770E−03 | −3.1376E−03 | 2.5338E−03 | −1.5075E−03 | 5.9719E−04 | −1.4925E−04 | 2.1078E−05 | −1.2745E−06 |
| S8 | −1.9543E−02 | 4.6327E−03 | −4.3288E−03 | 2.7936E−03 | −1.2443E−03 | 3.6584E−04 | −6.7167E−05 | 6.9784E−06 | −3.0937E−07 |
| S9 | −1.5943E−02 | 4.3402E−03 | −1.0753E−03 | 1.1081E−04 | 8.7145E−06 | −4.5804E−06 | 6.3284E−07 | −3.9120E−08 | 9.0141E−10 |
| S10 | −1.8587E−02 | 4.4498E−03 | −7.8826E−04 | 8.3383E−05 | −3.7865E−06 | −2.1983E−07 | 4.1641E−08 | −2.2095E−09 | 4.0889E−11 |
| S11 | −9.7947E−03 | 3.6942E−04 | 8.6053E−05 | −2.6269E−05 | 3.1328E−06 | −2.5312E−07 | 1.4289E−08 | −4.5993E−10 | 6.0651E−12 |
| S12 | 1.4050E−03 | −1.7124E−03 | 3.6964E−04 | −4.2906E−05 | 2.6797E−06 | −8.7334E−08 | 1.2868E−09 | −4.6010E−12 | −7.5235E−15 |
| S13 | −2.0301E−02 | 3.1485E−03 | −2.3826E−04 | 1.1172E−05 | −3.4316E−07 | 6.9053E−09 | −8.7262E−11 | 6.2324E−13 | −1.8970E−15 |
| S14 | −1.1502E−02 | 1.4227E−03 | −9.4639E−05 | 3.1710E−06 | −2.4818E−08 | −1.9478E−09 | 7.2613E−11 | −1.0264E−12 | 5.3913E−15 |

Figure 8A:
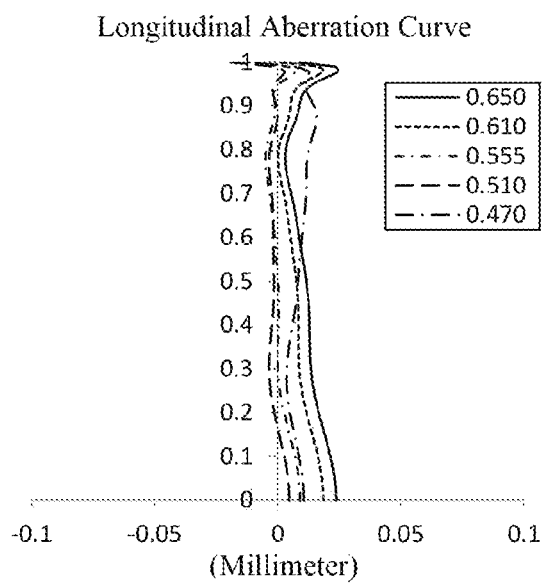
FIGS. 8A to 8D illustrate a longitudinal aberration curve, an astigmatic curve, a distortion curve, and a lateral color curve of the optical imaging lens group of the example 4, respectively.
Figure 8B:
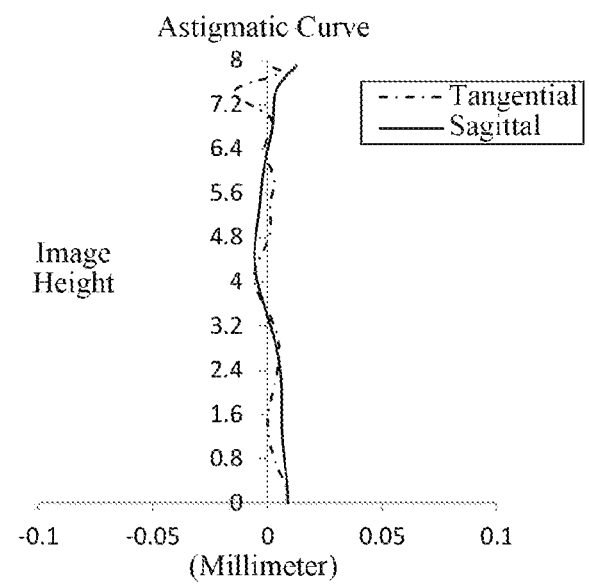
Figure 8C:
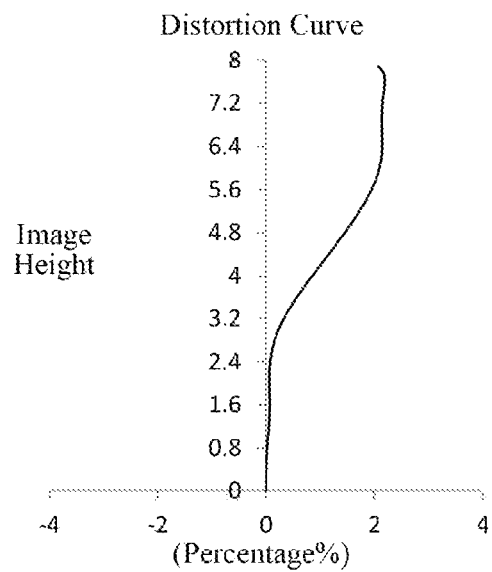
Figure 8D:
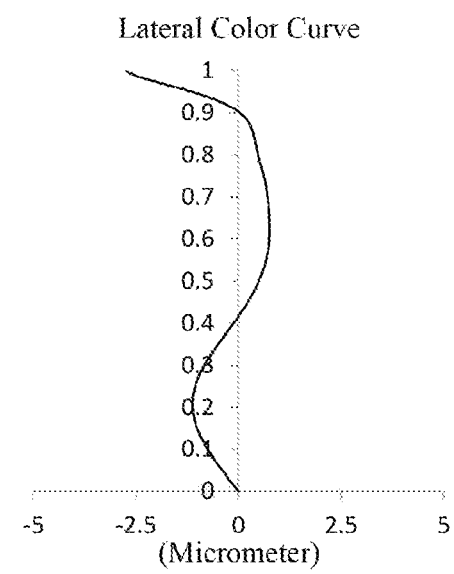

FIG. 8A illustrates a longitudinal aberration curve of the optical imaging lens group according to example 4, representing deviations of focal points converged by light of different wavelengths after passing through the lens assembly. FIG. 8B illustrates an astigmatic curve of the optical imaging lens group according to example 4, representing a curvature of a tangential plane and a curvature of a sagittal plane. FIG. 8C illustrates a distortion curve of the optical imaging lens group according to example 4, representing amounts of distortion corresponding to different image heights. FIG. 8D illustrates a lateral color curve of the optical imaging lens group according to example 4, representing deviations of different image heights on an imaging plane after light passes through the lens assembly. It can be seen from FIG. 8A to FIG. 8D that the optical imaging lens group provided in example 4 may achieve good image quality.

Example 5

An optical imaging lens group according to example 5 of the present disclosure is described below with reference to FIG. 9 to FIG. 10D. FIG. 9 shows a schematic structural view of the optical imaging lens group according to example 5 of the present disclosure.

As shown in FIG. 9, the optical imaging lens group includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens group is 9.03 mm, a total length TTL of the optical imaging lens group is 9.99 mm, half of a diagonal length ImgH of an effective pixel area on the imaging plane S17 of the optical imaging lens group is 8.00 mm, half of a maximal field-of-view Semi-FOV of the optical imaging lens group is 41.3°, and a ratio f/EPD of the total effective focal length f to an entrance pupil diameter EPD is 2.00.

Table 9 is a table illustrating basic parameters of the optical imaging lens group of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (1) given in the above example 1.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.9657 | | | | |
| S1 | Aspheric | 3.0783 | 1.1470 | 1.55 | 56.1 | 6.95 | −4.6495 |
| S2 | Aspheric | 14.1823 | 0.1475 | | | | 16.3983 |
| S3 | Aspheric | 23.0766 | 0.4000 | 1.67 | 19.2 | −18.93 | 71.4587 |
| S4 | Aspheric | 8.1864 | 0.4741 | | | | 6.7559 |
| S5 | Aspheric | 20.9684 | 0.4000 | 1.55 | 56.1 | −229.97 | 93.0053 |
| S6 | Aspheric | 17.8466 | 0.4356 | | | | 71.4407 |
| S7 | Aspheric | 39.7089 | 0.4076 | 1.67 | 20.4 | −116.25 | 6.9570 |
| S8 | Aspheric | 26.1456 | 0.5699 | | | | 82.9598 |
| S9 | Aspheric | 20.2753 | 0.7242 | 1.65 | 23.5 | −70.54 | 39.1754 |
| S10 | Aspheric | 13.8263 | 0.7904 | | | | −62.2225 |
| S11 | Aspheric | 6.3362 | 1.0133 | 1.55 | 56.1 | 9.90 | −2.9272 |
| S12 | Aspheric | −34.7218 | 1.7712 | | | | −25.2823 |
| S13 | Aspheric | −4.3073 | 0.6882 | 1.54 | 55.9 | −5.75 | −4.1699 |
| S14 | Aspheric | 11.4674 | 0.5129 | | | | −97.6327 |
| S15 | Spherical | Infinite | 0.2100 | 1.52 | 64.2 | | |
| S16 | Spherical | Infinite | 0.3008 | | | | |
| S17 | Spherical | Infinite | | | | | |

TABLE 10

| Surface number | A4 | A6 | A8 | A10 | A12 | A14 | A16 | A18 | A20 |
|---|---|---|---|---|---|---|---|---|---|
| S1 | 2.0323E−02 | −2.4556E−03 | 4.3782E−04 | 2.1149E−05 | −4.2306E−05 | 1.3677E−05 | −2.3565E−06 | 2.2092E−07 | −1.0646E−08 |
| S2 | −2.9439E−03 | 1.2174E−03 | −8.1748E−04 | 6.4385E−04 | −3.6937E−04 | 1.3044E−04 | −2.7183E−05 | 3.0640E−06 | −1.4504E−07 |
| S3 | −8.2396E−04 | 1.8261E−03 | 2.1431E−04 | −4.9089E−04 | 2.6918E−04 | −7.5962E−05 | 1.2247E−05 | −1.0340E−06 | 3.4940E−08 |
| S4 | 1.5788E−03 | 2.3672E−03 | −6.3293E−03 | 5.4402E−03 | −3.8287E−04 | 1.8169E−04 | −4.7099E−05 | 6.1925E−06 | −2.9019E−07 |
| S5 | −6.6647E−03 | −2.5794E−03 | 6.5325E−03 | −7.3403E−03 | 5.0059E−03 | −2.1185E−03 | 5.4252E−04 | −7.6905E−05 | 4.6313E−06 |
| S6 | −8.9582E−03 | 1.4634E−03 | −5.6025E−04 | 5.3220E−05 | 1.0892E−04 | −7.5008E−05 | 1.9719E−05 | −2.2334E−06 | 5.6593E−08 |
| S7 | −1.8814E−02 | 3.9019E−03 | −5.8455E−03 | 5.1082E−03 | −3.0697E−03 | 1.1994E−03 | −2.9121E−04 | 3.9687E−05 | −2.3103E−06 |
| S8 | −1.9984E−02 | 5.7682E−03 | −5.5329E−03 | 3.5248E−03 | −1.5737E−03 | 4.6862E−04 | −8.7655E−05 | 9.2931E−06 | −4.1974E−07 |
| S9 | −1.8821E−02 | 5.2325E−03 | −1.2860E−03 | 1.4182E−04 | 6.8341E−06 | −4.8725E−06 | 7.4050E−07 | −5.1477E−08 | 1.3734E−09 |
| S10 | −2.0392E−02 | 5.2264E−03 | −1.0074E−03 | 1.2951E−04 | −1.0737E−05 | 5.4520E−07 | −1.3049E−08 | −8.9314E−11 | 7.7952E−12 |
| S11 | −1.0653E−02 | 2.3837E−04 | 1.7628E−04 | −5.2678E−05 | 8.2689E−06 | −9.3173E−07 | 6.7285E−08 | −2.5860E−09 | 3.9673E−11 |
| S12 | −7.4001E−04 | −1.0193E−03 | 2.0576E−04 | −8.9191E−06 | −1.9825E−06 | 2.9006E−07 | −1.6152E−08 | 4.2115E−10 | −4.2543E−12 |
| S13 | −2.0819E−02 | 3.2618E−03 | −2.4274E−04 | 1.0889E−05 | −3.1016E−07 | 5.5552E−09 | −5.8310E−11 | 2.9570E−13 | −3.4635E−16 |
| S14 | −1.1832E−02 | 1.4488E−03 | −9.3527E−05 | 2.7135E−06 | 1.6609E−08 | −3.7835E−09 | 1.1653E−10 | −1.5697E−12 | 8.1117E−15 |

FIG. 10A illustrates a longitudinal aberration curve of the optical imaging lens group according to example 5, representing deviations of focal points converged by light of different wavelengths after passing through the lens assembly. FIG. 10B illustrates an astigmatic curve of the optical imaging lens group according to example 5, representing a curvature of a tangential plane and a curvature of a sagittal plane. FIG. 10C illustrates a distortion curve of the optical imaging lens group according to example 5, representing amounts of distortion corresponding to different image heights. FIG. 10D illustrates a lateral color curve of the optical imaging lens group according to example 5, representing deviations of different image heights on an imaging plane after light passes through the lens assembly. It can be seen from FIG. 10A to FIG. 10D that the optical imaging lens group provided in example 5 may achieve good image quality.

Example 6

An optical imaging lens group according to example 6 of the present disclosure is described below with reference to FIG. 11 to FIG. 12D. FIG. 11 shows a schematic structural view of the optical imaging lens group according to example 6 of the present disclosure.

As shown in FIG. 11, the optical imaging lens group includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens group is 9.03 mm, a total length TTL of the optical imaging lens group is 10.00 mm, half of a diagonal length ImgH of an effective pixel area on the imaging plane S17 of the optical imaging lens group is 8.00 mm, half of a maximal field-of-view Semi-FOV of the optical imaging lens group is 41.3°, and a ratio f/EPD of the total effective focal length f to an entrance pupil diameter EPD is 2.00.

Table 11 is a table illustrating basic parameters of the optical imaging lens group of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (1) given in the above example 1.

Figure 12A:
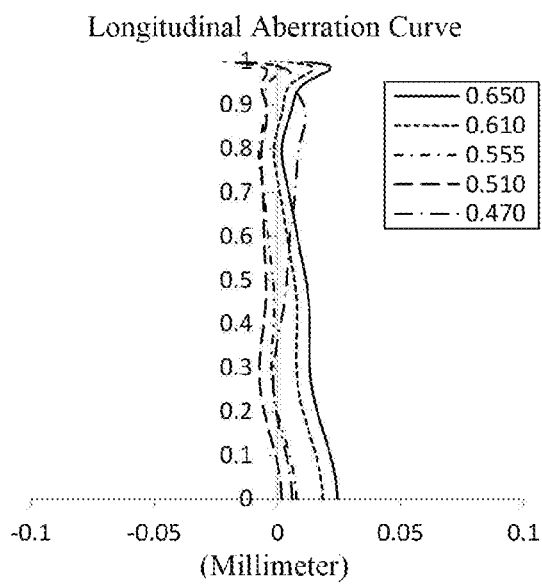
FIGS. 12A to 12D illustrate a longitudinal aberration curve, an astigmatic curve, a distortion curve, and a lateral color curve of the optical imaging lens group of the example 6, respectively.
Figure 12B:
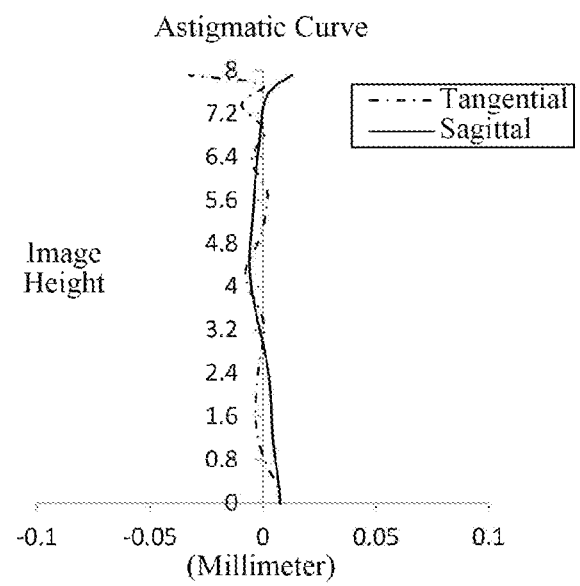
Figure 12C:
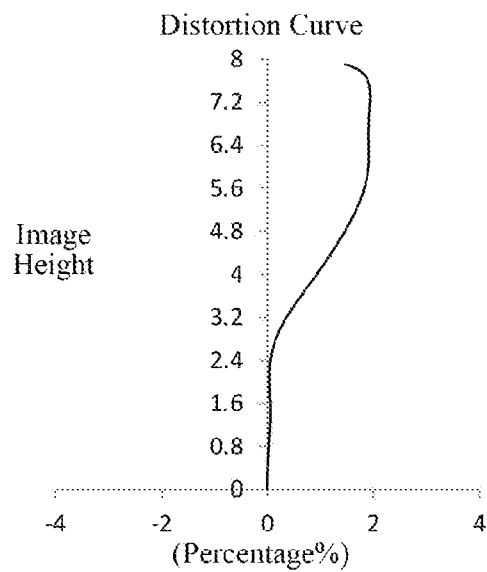
Figure 12D:
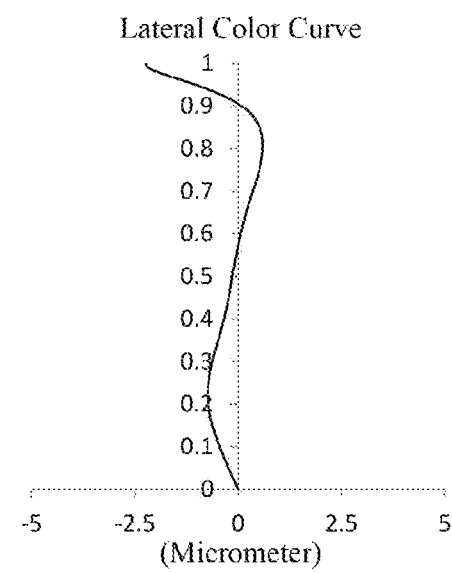

FIG. 12A illustrates a longitudinal aberration curve of the optical imaging lens group according to example 6, representing deviations of focal points converged by light of different wavelengths after passing through the lens assembly. FIG. 12B illustrates an astigmatic curve of the optical imaging lens group according to example 6, representing a curvature of a tangential plane and a curvature of a sagittal plane. FIG. 12C illustrates a distortion curve of the optical imaging lens group according to example 6, representing amounts of distortion corresponding to different image heights. FIG. 12D illustrates a lateral color curve of the optical imaging lens group according to example 6, representing deviations of different image heights on an imaging plane after light passes through the lens assembly. It can be seen from FIG. 12A to FIG. 12D that the optical imaging lens group provided in example 6 may achieve good image quality.

Example 7

An optical imaging lens group according to example 7 of the present disclosure is described below with reference to

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.9620 | | | | |
| S1 | Aspheric | 3.0803 | 1.1292 | 1.55 | 56.1 | 7.07 | −4.6789 |
| S2 | Aspheric | 13.2493 | 0.2522 | | | | 15.5228 |
| S3 | Aspheric | 23.2788 | 0.4507 | 1.67 | 19.2 | −16.99 | 71.7797 |
| S4 | Aspheric | 7.6437 | 0.3892 | | | | 5.6527 |
| S5 | Aspheric | 15.0629 | 0.4000 | 1.55 | 56.1 | 100.52 | 56.7579 |
| S6 | Aspheric | 20.5668 | 0.4103 | | | | 98.9790 |
| S7 | Aspheric | 331.1218 | 0.4307 | 1.67 | 20.4 | −41.31 | 51.7163 |
| S8 | Aspheric | 25.4028 | 0.5305 | | | | 32.7294 |
| S9 | Aspheric | 17.9065 | 0.7388 | 1.65 | 23.5 | 200.00 | 29.3212 |
| S10 | Aspheric | 20.4586 | 0.9104 | | | | −71.8662 |
| S11 | Aspheric | 6.1564 | 0.9297 | 1.55 | 56.1 | 10.76 | −3.0560 |
| S12 | Aspheric | −121.0868 | 1.6784 | | | | 92.0059 |
| S13 | Aspheric | −4.4112 | 0.6779 | 1.54 | 55.9 | −5.84 | −4.8845 |
| S14 | Aspheric | 11.4105 | 0.5361 | | | | −96.0167 |
| S15 | Spherical | Infinite | 0.2100 | 1.52 | 64.2 | | |
| S16 | Spherical | Infinite | 0.3259 | | | | |
| S17 | Spherical | Infinite | | | | | |

TABLE 12

| Surface number | A4 | A6 | A8 | A10 | A12 | A14 | A16 | A18 | A20 |
|---|---|---|---|---|---|---|---|---|---|
| S1 | 2.0376E−02 | −2.6179E−03 | 5.0770E−04 | 2.5738E−05 | −7.0612E−05 | 2.9513E−05 | −6.5181E−06 | 7.7127E−07 | −3.9937E−08 |
| S2 | −1.7575E−03 | 7.6316E−04 | −9.5871E−04 | 8.0298E−04 | −4.2689E−04 | 1.4007E−04 | −2.7639E−05 | 2.9961E−06 | −1.3810E−07 |
| S3 | 3.7808E−04 | 1.2387E−03 | −3.4138E−04 | 2.8638E−04 | −1.7993E−04 | 7.5165E−05 | −1.8327E−05 | 2.3944E−06 | −1.2876E−07 |
| S4 | 1.4843E−03 | 1.6300E−03 | −6.7376E−05 | −2.4893E−04 | 4.1675E−04 | −2.7067E−04 | 9.7327E−05 | −1.8343E−05 | 1.4455E−06 |
| S5 | −7.3318E−03 | −1.9947E−04 | 1.4781E−04 | −4.0028E−04 | 3.6721E−04 | −1.7853E−04 | 4.8358E−05 | −6.8046E−06 | 3.6259E−07 |
| S6 | −7.7452E−03 | 2.0604E−03 | −2.7312E−03 | 2.1067E−03 | −1.1206E−03 | 3.9727E−04 | −9.1893E−05 | 1.2501E−05 | −7.8460E−07 |
| S7 | −2.1553E−02 | 4.3468E−03 | −4.0015E−03 | 2.3906E−03 | −1.1597E−03 | 4.1758E−04 | −1.0254E−04 | 1.4813E−05 | −9.3271E−07 |
| S8 | −2.4261E−02 | 8.3101E−03 | −6.6586E−03 | 3.9075E−03 | −1.6644E−03 | 4.8278E−04 | −8.8894E−05 | 9.3334E−06 | −4.1968E−07 |
| S9 | −2.0046E−02 | 6.0780E−03 | −1.8679E−03 | 3.7205E−04 | −5.2012E−05 | 4.5805E−06 | −1.5554E−07 | −5.5113E−09 | 3.7086E−10 |
| S10 | −2.0802E−02 | 5.2419E−03 | −1.0476E−03 | 1.4558E−04 | −1.4492E−05 | 1.0501E−06 | −4.9506E−08 | 1.2292E−09 | −1.1612E−11 |
| S11 | −1.0249E−02 | 1.0802E−03 | 1.6066E−04 | −4.1776E−05 | 5.7766E−06 | −6.1101E−07 | 4.3825E−08 | −1.6871E−09 | 2.5725E−11 |
| S12 | −1.2066E−03 | −1.1167E−03 | 2.4827E−04 | −1.7980E−05 | −9.5710E−07 | 2.2738E−07 | −1.4092E−08 | 3.8902E−10 | −4.1126E−12 |
| S13 | −2.2112E−02 | 3.7542E−03 | −3.1779E−04 | 1.6790E−05 | −5.8228E−07 | 1.3252E−08 | −1.9025E−10 | 1.5559E−12 | −5.4904E−15 |
| S14 | −1.2380E−02 | 1.7041E−03 | −1.2769E−04 | 5.0631E−06 | −7.6841E−08 | −1.6929E−09 | 9.4388E−11 | −1.5397E−12 | 8.9542E−15 |

Figure 13:
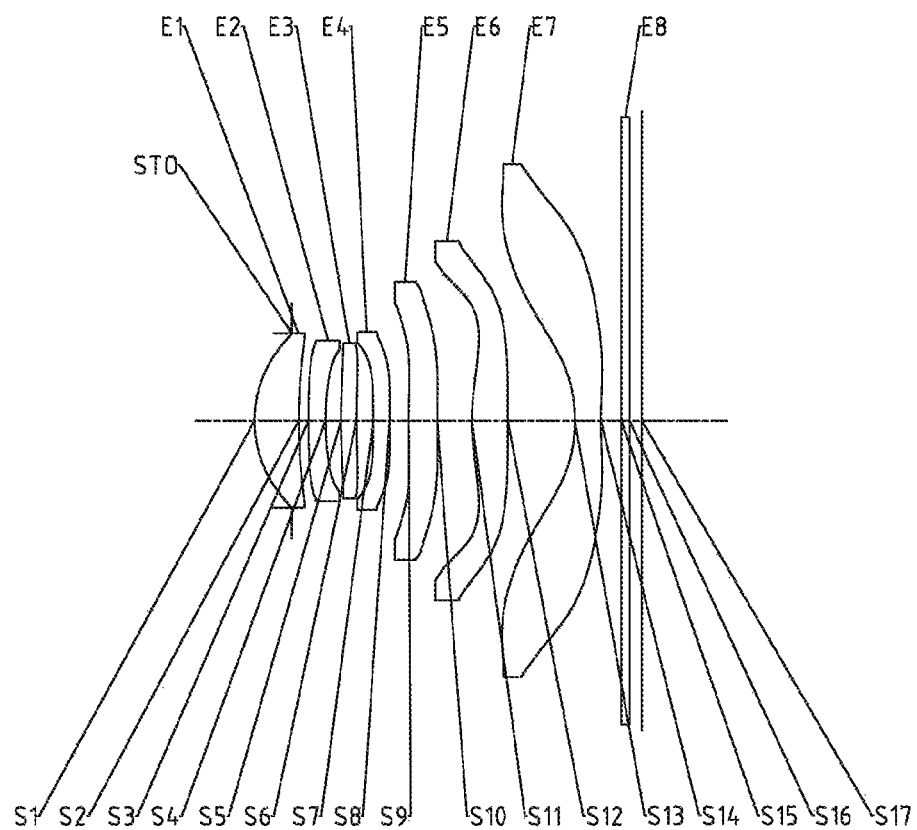
FIG. 13 illustrates a schematic structural view of an optical imaging lens group according to example 7 of the present disclosure.
Figures 14A, 14B:
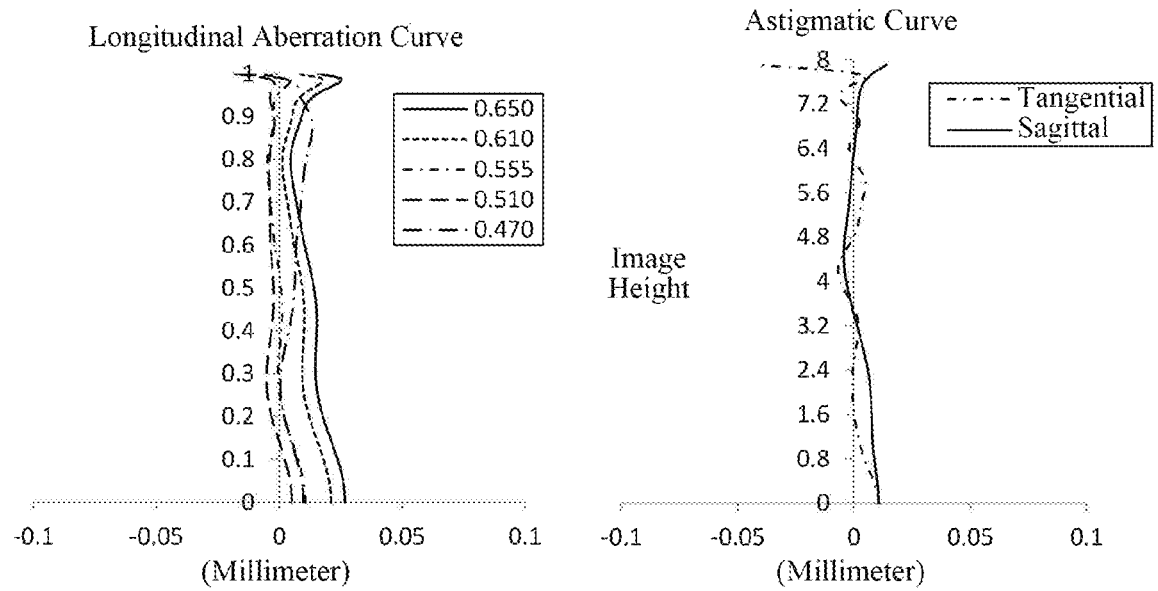
FIGS. 14A to 14D illustrate a longitudinal aberration curve, an astigmatic curve, a distortion curve, and a lateral color curve of the optical imaging lens group of the example 7, respectively.
Figure 14C:
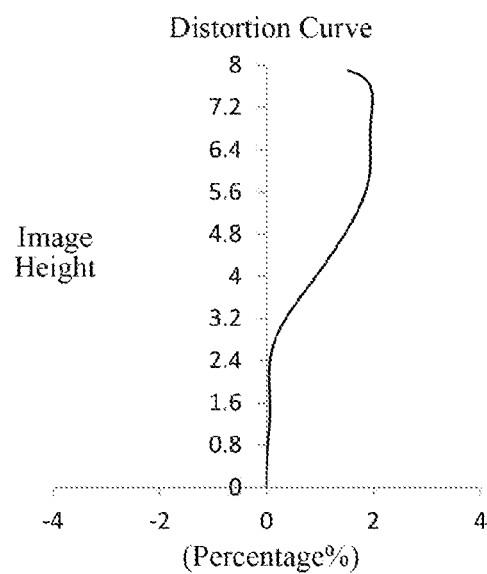
Figure 14D:
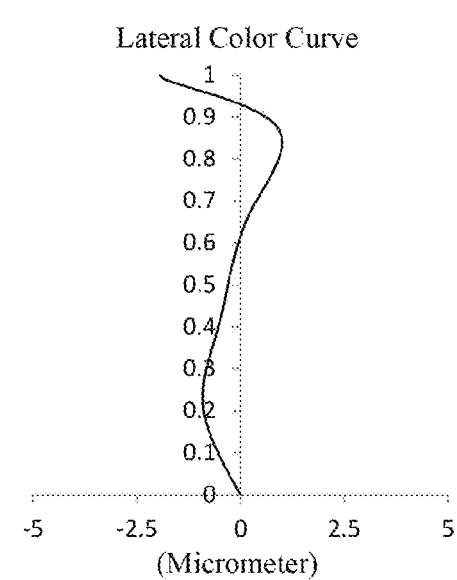

FIG. 13 to FIG. 14D. FIG. 13 shows a schematic structural view of the optical imaging lens group according to example 7 of the present disclosure.

As shown in FIG. 13, the optical imaging lens group includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a concave surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens group is 9.02 mm, a total length TTL of the optical imaging lens group is 10.00 mm, half of a diagonal length ImgH of an effective pixel area on the imaging plane S17 of the optical imaging lens group is 8.00 mm, half of a maximal field-of-view Semi-FOV of the optical imaging lens group is 41.3°, and a ratio f/EPD of the total effective focal length f to an entrance pupil diameter EPD is 2.00.

Table 13 is a table illustrating basic parameters of the optical imaging lens group of example 7, wherein the units for the radius of curvature, the thickness/distance and the focal length are millimeter (mm). Table 14 shows high-order coefficients applicable to each aspheric surface in example 7, wherein the surface shape of each aspheric surface may be defined by the formula (1) given in the above example 1.

TABLE 13

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.9625 | | | | |
| S1 | Aspheric | 3.0799 | 1.1383 | 1.55 | 56.1 | 7.08 | −4.6717 |
| S2 | Aspheric | 13.2120 | 0.2500 | | | | 15.0776 |
| S3 | Aspheric | 23.5886 | 0.4449 | 1.67 | 19.2 | −17.19 | 74.3459 |
| S4 | Aspheric | 7.7387 | 0.3983 | | | | 5.8926 |
| S5 | Aspheric | 15.1435 | 0.4000 | 1.55 | 56.1 | 102.43 | 57.5877 |
| S6 | Aspheric | 20.5736 | 0.4343 | | | | 98.8836 |
| S7 | Aspheric | −74.4294 | 0.4175 | 1.67 | 20.4 | −38.17 | −98.9862 |
| S8 | Aspheric | 38.7375 | 0.4904 | | | | 99.0000 |
| S9 | Aspheric | 16.4808 | 0.7409 | 1.65 | 23.5 | 230.00 | 24.9523 |
| S10 | Aspheric | 18.2153 | 0.8965 | | | | −67.4140 |
| S11 | Aspheric | 5.9356 | 0.9245 | 1.55 | 56.1 | 10.66 | −3.0062 |
| S12 | Aspheric | −278.5706 | 1.7312 | | | | 99.0000 |
| S13 | Aspheric | −4.4562 | 0.6711 | 1.54 | 55.9 | −5.87 | −5.2134 |
| S14 | Aspheric | 11.3201 | 0.5313 | | | | −99.0000 |
| S15 | Spherical | Infinite | 0.2100 | 1.52 | 64.2 | | |
| S16 | Spherical | Infinite | 0.3185 | | | | |
| S17 | Spherical | Infinite | | | | | |

TABLE 14

| Surface number | A4 | A6 | A8 | A10 | A12 | A14 | A16 | A18 | A20 |
|---|---|---|---|---|---|---|---|---|---|
| S1 | 2.0357E−02 | −2.6048E−03 | 5.3077E−04 | −1.0579E−05 | −4.6436E−05 | 2.0658E−05 | −4.6593E−06 | 5.6047E−07 | −2.9912E−08 |
| S2 | −1.7990E−03 | 7.5636E−04 | −9.3427E−04 | 7.8041E−04 | −4.1515E−04 | 1.3606E−04 | −2.6812E−05 | 2.9031E−06 | −1.3362E−07 |
| S3 | 3.5857E−04 | 1.3464E−03 | −4.1906E−04 | 3.5024E−04 | −2.1870E−04 | 8.9509E−05 | −2.1468E−05 | 2.7740E−06 | −1.4807E−07 |
| S4 | 1.4412E−03 | 1.6823E−03 | 4.9272E−05 | −4.2965E−04 | 5.6469E−04 | −3.4383E−04 | 1.1893E−04 | −2.1848E−05 | 1.6890E−06 |
| S5 | −7.9493E−03 | −6.6889E−04 | 5.6504E−04 | −5.2371E−04 | 3.2039E−04 | −1.2337E−04 | 2.7825E−05 | −3.2039E−06 | 1.1180E−07 |
| S6 | −7.6398E−03 | 1.2696E−03 | −2.2116E−03 | 1.8498E−03 | −1.0108E−03 | 3.5747E−04 | −8.1287E−05 | 1.0788E−05 | −6.6317E−07 |
| S7 | −1.9413E−02 | 2.0502E−03 | −1.7612E−03 | 4.4043E−04 | 1.6999E−05 | −4.1087E−05 | 7.5852E−06 | 2.8079E−08 | −8.1983E−08 |
| S8 | −2.2800E−02 | 7.2941E−03 | −6.0358E−03 | 3.5180E−03 | −1.4909E−03 | 4.3402E−04 | −8.0619E−05 | 8.5662E−06 | −3.9017E−07 |
| S9 | −2.0615E−02 | 6.9156E−03 | −2.3449E−03 | 5.4774E−04 | −9.6678E−05 | 1.2443E−05 | −1.0351E−06 | 4.8780E−08 | −1.0113E−09 |
| S10 | −2.1319E−02 | 5.7649E−03 | −1.2226E−03 | 1.8209E−04 | −1.9789E−05 | 1.6068E−06 | −8.9657E−08 | 2.9382E−09 | −4.2766E−11 |
| S11 | −1.0774E−02 | 2.8767E−04 | 1.3604E−04 | −4.0469E−05 | 5.8355E−06 | −6.3103E−07 | 4.5820E−08 | −1.7789E−09 | 2.7317E−11 |
| S12 | −1.2611E−03 | −1.1151E−03 | 2.7227E−04 | −2.4853E−05 | −8.5833E−08 | 1.6593E−07 | −1.1588E−08 | 3.3368E−10 | −3.5972E−12 |
| S13 | −2.2696E−02 | 3.8908E−03 | −3.3319E−04 | 1.7780E−05 | −6.2198E−07 | 1.4277E−08 | −2.0687E−10 | 1.7099E−12 | −6.1109E−15 |
| S14 | −1.2365E−02 | 1.6770E−03 | −1.2170E−04 | 4.4621E−06 | −4.2393E−08 | −2.8801E−09 | 1.1870E−10 | −1.8122E−12 | 1.0244E−14 |

FIG. 14A illustrates a longitudinal aberration curve of the optical imaging lens group according to example 7, representing deviations of focal points converged by light of different wavelengths after passing through the lens assembly. FIG. 14B illustrates an astigmatic curve of the optical imaging lens group according to example 7, representing a curvature of a tangential plane and a curvature of a sagittal plane. FIG. 14C illustrates a distortion curve of the optical imaging lens group according to example 7, representing amounts of distortion corresponding to different image heights. FIG. 14D illustrates a lateral color curve of the optical imaging lens group according to example 7, representing deviations of different image heights on an imaging plane after light passes through the lens assembly. It can be seen from FIG. 14A to FIG. 14D that the optical imaging lens group provided in example 7 may achieve good image quality.

In view of the above, examples 1 to 7 respectively satisfy the relationship shown in Table 15.

TABLE 15

| Condition | Example | | | | | | |
|---|---|---|---|---|---|---|---|
| | 1 | 2 | 3 | 4 | 5 | 6 | 7 |
| f*tan(HFOV) (mm) | 7.92 | 7.88 | 7.87 | 7.87 | 7.92 | 7.92 | 7.92 |
| TTL/ImgH | 1.25 | 1.28 | 1.25 | 1.25 | 1.25 | 1.25 | 1.25 |
| DT51/DT71 | 0.47 | 0.47 | 0.49 | 0.68 | 0.47 | 0.48 | 0.49 |
| f1/f | 0.79 | 0.81 | 0.81 | 0.81 | 0.77 | 0.78 | 0.78 |
| f7/f6 | −0.58 | −0.61 | −0.62 | −0.62 | −0.58 | −0.54 | −0.55 |
| f/(R2 − R1) | 0.94 | 0.90 | 0.89 | 0.88 | 0.81 | 0.89 | 0.89 |
| (R4 − R3)/f2 | 0.63 | 0.66 | 0.65 | 0.68 | 0.79 | 0.92 | 0.92 |
| R5/R6 | 0.70 | 0.72 | 0.71 | 0.71 | 1.17 | 0.73 | 0.74 |
| R9/R8 | 0.58 | 0.82 | 0.53 | 0.59 | 0.78 | 0.70 | 0.43 |
| R11/f6 | 0.62 | 0.63 | 0.53 | 0.53 | 0.64 | 0.57 | 0.56 |
| R13/R14 | −0.37 | −0.42 | −0.39 | −0.38 | −0.38 | −0.39 | −0.39 |
| CT1/(CT2 + CT3 + CT4) | 0.84 | 0.86 | 0.83 | 0.86 | 0.95 | 0.88 | 0.90 |
| T23/(T12 + T34) | 0.59 | 0.60 | 0.57 | 0.57 | 0.81 | 0.59 | 0.58 |
| (CT5 + CT6)/(T56 + T67) | 0.67 | 0.73 | 0.70 | 0.71 | 0.68 | 0.64 | 0.63 |
| SAG61/SAG62 | 0.69 | 0.66 | 0.68 | 0.69 | 0.64 | 0.74 | 0.74 |
| SAG71/SAG72 | 0.88 | 0.91 | 0.92 | 0.93 | 0.88 | 0.89 | 0.89 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens group described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens group, comprising: a first lens, a second lens, a third lens, a fourth lens, a fifth lens, a sixth lens and a seventh lens, which are sequentially arranged from an object side to an image side of the optical imaging lens group along an optical axis and each of which has refractive power, wherein, the first lens has positive refractive power, a convex object-side surface, and a concave image-side surface, wherein f*tan(Semi-FOV)>7.5 mm, and TTL/ImgH<1.3, where f is a total effective focal length of the optical imaging lens group, Semi-FOV is half of a maximal field-of-view of the optical imaging lens group, TTL is a distance along the optical axis from the object-side surface of the first lens to an imaging plane of the optical imaging lens group, and ImgH is half of a diagonal length of an effective pixel area on the imaging plane of the optical imaging lens group.

2. The optical imaging lens group according to claim 1, wherein 0.3<DT51/DT71<0.8, where DT51 is a maximum effective radius of an object-side surface of the fifth lens, and DT71 is a maximum effective radius of an object-side surface of the seventh lens.

3. The optical imaging lens group according to claim 1, wherein 0.5<f1/f<1.0, where f is the total effective focal length of the optical imaging lens group, and f1 is an effective focal length of the first lens.

4. The optical imaging lens group according to claim 1, wherein −1.0<f7/f6<0, where f6 is an effective focal length of the sixth lens, and f7 is an effective focal length of the seventh lens.

5. The optical imaging lens group according to claim 1, wherein 0.5<f/(R2−R1)<1.5, where f is the total effective focal length of the optical imaging lens group, R1 is a radius of curvature of the object-side surface of the first lens, and R2 is a radius of curvature of the image-side surface of the first lens.

6. The optical imaging lens group according to claim 1, wherein the second lens has negative refractive power, a convex object-side surface and a concave image-side surface.

7. The optical imaging lens group according to claim 6, wherein 0.5<(R4−R3)/f2<1.5, where f2 is an effective focal length of the second lens, R3 is a radius of curvature of the object-side surface of the second lens, and R4 is a radius of curvature of the image-side surface of the second lens.

8. The optical imaging lens group according to claim 1, wherein
an object-side surface of the third lens is convex, and an image-side surface of the third lens is concave;
the fourth lens has negative refractive power, and a concave image-side surface; and
an object-side surface of the fifth lens is convex.

9. The optical imaging lens group according to claim 8, wherein $0.5<R5/R6<1.5$,
where R5 is a radius of curvature of the object-side surface of the third lens, and R6 is a radius of curvature of the image-side surface of the third lens.

10. The optical imaging lens group according to claim 8, wherein $0.3<R9/R8<1.3$,
where R8 is a radius of curvature of the image-side surface of the fourth lens, and R9 is a radius of curvature of the object-side surface of the fifth lens.

11. The optical imaging lens group according to claim 1, wherein
the sixth lens has positive refractive power, and a convex object-side surface; and
the seventh lens has negative refractive power, a concave object-side surface, and a concave image-side surface.

12. The optical imaging lens group according to claim 11, wherein $0.5<R11/f6<1.0$,
where R11 is a radius of curvature of the object-side surface of the sixth lens, and f6 is an effective focal length of the sixth lens.

13. The optical imaging lens group according to claim 11, wherein $-1.0<R13/R14<0$,
where R13 is a radius of curvature of the object-side surface of the seventh lens, and R14 is a radius of curvature of the image-side surface of the seventh lens.

14. The optical imaging lens group according to claim 1, wherein $0.5<SAG61/SAG62<1.0$,
where SAG61 is a distance along the optical axis from an intersection of an object-side surface of the sixth lens and the optical axis to a vertex of an effective radius of the object-side surface of the sixth lens, and SAG62 is a distance along the optical axis from an intersection of an image-side surface of the sixth lens and the optical axis to a vertex of an effective radius of the image-side surface of the sixth lens.

15. The optical imaging lens group according to claim 1, wherein $0.7<SAG71/SAG72<1.2$,
where SAG71 is a distance along the optical axis from an intersection of an object-side surface of the seventh lens and the optical axis to a vertex of an effective radius of the object-side surface of the seventh lens, and SAG72 is a distance along the optical axis from an intersection of an image-side surface of the seventh lens and the optical axis to a vertex of an effective radius of the image-side surface of the seventh lens.

16. The optical imaging lens group according to claim 1, wherein $0.7<CT1/(CT2+CT3+CT4)<1.2$,
where CT1 is a center thickness of the first lens along the optical axis, CT2 is a center thickness of the second lens along the optical axis, CT3 is a center thickness of the third lens along the optical axis, and CT4 is a center thickness of the fourth lens along the optical axis.

17. The optical imaging lens group according to claim 1, wherein $0.5<T23/(T12+T34)<1$,
where T12 is a spaced interval between the first lens and the second lens along the optical axis, T23 is a spaced interval between the second lens and the third lens along the optical axis, and T34 is a spaced interval between the third lens and the fourth lens along the optical axis.

18. The optical imaging lens group according to claim 1, wherein $0.5<(CT5+CT6)/(T56+T67)<1.0$,
where CT5 is a center thickness of the fifth lens along the optical axis, CT6 is a center thickness of the sixth lens along the optical axis, T56 is a spaced interval between the fifth lens and the sixth lens along the optical axis, and T67 is a spaced interval between the sixth lens and the seventh lens along the optical axis.

19. An optical imaging lens group, comprising: a first lens, a second lens, a third lens, a fourth lens, a fifth lens, a sixth lens and a seventh lens, which are sequentially arranged from an object side to an image side of the optical imaging lens group along an optical axis and each of which has refractive power,
wherein $f*\tan(\text{Semi-FOV})>7.5$ mm, and
$0.5<f1/f<1.0$,
where f is a total effective focal length of the optical imaging lens group, Semi-FOV is half of a maximal field-of-view of the optical imaging lens group, and f1 is an effective focal length of the first lens.

20. The optical imaging lens group according to claim 19, wherein
the second lens has negative refractive power, a convex object-side surface, and a concave image-side surface,
an object-side surface of the third lens is convex, and an image-side surface thereof is concave;
the fourth lens has negative refractive power, and a concave image-side surface;
an object-side surface of the fifth lens is convex,
the sixth lens has positive refractive power, and a convex object-side surface; and
the seventh lens has negative refractive power, a concave object-side surface, and a concave image-side surface.

* * * * *